United States Patent
Lading et al.

(10) Patent No.: US 6,320,272 B1
(45) Date of Patent: Nov. 20, 2001

(54) WIND TURBINE WITH A WIND VELOCITY MEASUREMENT SYSTEM

(75) Inventors: Lars Lading, Roskilde; Sten Frandsen, Lejre; Ole Sangill, Ishøj; Jesper Kjær Hansen, Ebeltoft, all of (DK)

(73) Assignee: Forskningscenter Riso, Roskilde (DK)

( * ) Notice: Subject to any disclaimer, the term of this patent is extended or adjusted under 35 U.S.C. 154(b) by 0 days.

(21) Appl. No.: 09/381,830

(22) PCT Filed: Mar. 26, 1998

(86) PCT No.: PCT/DK98/00125

§ 371 Date: Jan. 14, 2000

§ 102(e) Date: Jan. 14, 2000

(87) PCT Pub. No.: WO98/42980

PCT Pub. Date: Oct. 1, 1998

(30) Foreign Application Priority Data

Mar. 26, 1997 (DK) .................................................. 0359/97

(51) Int. Cl.⁷ ....................................................... F03D 7/02

(52) U.S. Cl. .............................................. 290/44; 290/55

(58) Field of Search .................... 290/44, 43, 54, 290/55; 417/334; 416/31

(56) References Cited

U.S. PATENT DOCUMENTS

| | | | |
|---|---|---|---|
| 4,331,881 | * 5/1982 | Soderholm et al. | 290/44 |
| 4,339,666 | 7/1982 | Patrick et al. | 290/44 |
| 4,348,156 | 9/1982 | Andrews | 416/48 |
| 4,357,542 | * 11/1982 | Kirschbaum | 290/44 |
| 4,464,579 | * 8/1984 | Schwarz | 290/44 |
| 4,613,762 | 9/1986 | Soderholm | 290/44 |
| 4,651,017 | 3/1987 | Longrigg | 290/44 |
| 5,155,375 | * 10/1992 | Holley | 290/44 |

FOREIGN PATENT DOCUMENTS

| | | |
|---|---|---|
| 2623919 | 12/1977 | (DE) . |
| 2623919 A | 12/1977 | (DE) . |
| 0042521 A | 12/1981 | (EP) . |
| 0042521A2 | 12/1981 | (EP) . |
| 2250394A | 6/1992 | (GB) . |
| WO 9602009 | 1/1996 | (WO) . |

OTHER PUBLICATIONS

J.M. Vaughan et al., "Laser Doppler Velocimetry Applied to the Measurement of Local and Global Wind," Wind Engineering vol. 13, No. 1, 1989, pp. 1–15.

B. Morbieu et al., "True Airspeed Measurement with a Coherent Laser Radar," 3rd International Conference on Advanced Infrared Detectors and Systems, Jun. 3–5, 1986, London, UK.

D.A. Spera, "Wind Turbine Technology," 1994, ASME Press, New York XP–002068819 216470, pp. 218–221.

J.R. Connell et al., "A New Look at Turbulence Experienced by a Rotating Wind Turbine," 6th Annual Symp., Houston, TX, 1986, 455–479.

LDA–Windgeschwindingkeitsmessungen; Möglichkeiten für Messungen an Windkraftanlagen, Prof. Dr. F. Durst, KFA, Feb. 1984, pp. 123–138.

R.M. Hardesty et al., "Lidar Measurement of Turbulence Encountered by Horizontal–Axis Wind Turbines," CIRES, University of Colorado, Mar. 1987, 1987 American MeteOrological Society, pp. 191–203.

(List continued on next page.)

*Primary Examiner*—Nicholas Ponomarenko

(57) ABSTRACT

A wind turbine includes a laser wind velocity measurement system mounted on a nacelle of the wind turbine for determination of air velocities at the same relative position in front of the wind turbine, and which compensates for wind velocity changes prior to impingement of the air flow on the adjustable pitch wind turbine blades so that desired maximum tip speeds, tip speed ratios, and normalized power output $C_p$ may be maintained.

25 Claims, 23 Drawing Sheets

OTHER PUBLICATIONS

D.W. Bridson, "Wind Speed Measurement for Wind Turbine Testing," University of Exeter, 1$^{st}$ BWEA Workshop, Apr. 1979, pp. 208–217.

Th. Reichmann et al., "Performance of a Laser Doppler Anemometer for the Measurement of Wind Velocities," European Community Wind Energy Conference, Sep. 10–14, 1990, pp. 114–118.

Vaughan J M et al., vol. 13, No. 1, 1989, pp. 1–15, XP002057358.

Morbieu B. et al., Jun. 3, 1986, pp. 154.

Spera D.A.; 1994, Asme Press, New York XP002068819 216470 p. 220—p. 221.

* cited by examiner-

Basic closed-loop control system

US 6,320,272 B1

WIND TURBINE WITH A WIND VELOCITY MEASUREMENT SYSTEM

This application is the national phase under 35 U.S.C. §371 of PCT International Application Ser. No. PCT/DK98/00125 which has an International filing date of Mar. 25, 1998, which designated the United States of America.

FIELD OF THE INVENTION

The present invention relates to a wind turbine comprising a wind velocity measurement system for determination of air velocities in front of the wind turbine.

BACKGROUND OF THE INVENTION

Wind turbines are becoming an important source of electric energy. The majority of wind turbines are connected to the electric grid. As the number of larger turbines increases the need for reliable local wind measurements for power curve determination and for advanced control becomes more important.

Having a history of millennia and a century of obscurity following the introduction of fossil fuel engines, the wind power technology had its revival in the mid-seventies as a consequence of the oil crises. Various traditional applications such as water pumping and grain-grinding and small wind turbines for charging of batteries in remote areas have, in modernised form had their renaissance. However, a large fraction of the global energy supply is now delivered in the form of electricity and thus the major effort in wind power technology was placed in the development of electricity generating machines. Therefore, nearly the entire manufactured wind turbine capacity is now so-called grid connected wind turbines.

The modern "stock-average" wind turbine has an aerodynamic rotor with two or—most frequently—three blades. The rotational speed of the rotor is one-half to one revolution per second; through a gearbox the speed is increased to a level suitable to an electrical generator which is typically of the induction type: the rotor of the (electric) generator is magnetised by the grid and once the connection to the grid has been established the rotational speed is kept constant within 1–2% over the range of operational wind speeds, 3–25 m/s. The nacelle (machine cabin) with the gearbox and electric generator is mounted on a tubular or lattice tower through a motor-driven yaw system which by means of a wind direction sensor keeps the wind turbine facing the wind. When the blades are fixed to the rotor hub the machine is said to be stall-regulated because the blade profile angle to the wind has been selected so that the blades stall and loose power when the rated power of the electric generator is reached. If the blades can be pitched the machine is said to be pitch-regulated: when rated power of the electric generator is reached, the blades are pitched to limit the aerodynamic power.

Wind turbines operating with variable speed are also known.

The grid connected wind turbine is equipped with a control system providing smooth cut-in and cut-out of the grid, correct yaw positioning of the rotor, and pitch setting of the blades, stopping of the machine if voltage is too high or too low or if loads on the phases are not balanced, stopping of the machine if unacceptable vibrations are experienced or the temperature of gearbox or generator is too high etc. A number of sensors are connected to the control system; sensors monitoring the air flow may be a wind vane and a cup anemometer mounted on top of the nacelle—just behind the rotor and the flow is therefore rather disturbed compared to free-flow conditions.

The grid-connected wind turbines built and sold commercially in the seventies had installed capacities of 20 to 50 kW and aerodynamic rotor diameters of 5 to 15 m. In 1997, the typical commercially available machines have installed capacities of 500 to 800 kW and rotor diameters of 40 to 50 m. The next generation of machines presently being tested are 1 to 1.5 MW. This urge to increase size probably stems from belief in "economy of scale", i.e. the larger the cheaper, and from the fact that it is easier to fit into the landscape one 1 MW machine than ten 100 kW machines.

Cost of energy from wind power plants depends foremost on the wind energy resources, i.e. the kinetic energy flowing through the area covered by the wind turbine's rotor (per sec.):

$$P_{total} = A_r \int_0^\infty 1/2 \rho u^3 f(u) du, \qquad (1)$$

where $A_r$ is the area swept by the rotor, $\rho$ is the air density, u is the wind speed and f is the frequency distribution of wind speed. The consequence of the available energy being a function of the cubed wind speed is that if the annual mean wind speed at one site is 20% higher than at another site the available energy is $\{(1.2)^3-1\} \cong 70\%$ higher. Thus, moving from a site with an annual mean wind speed of 5 m/s to a site with 6 m/s the cost of energy (potentially) drops $1/1.7 \cong 58\%$ thus, illustrating the vast importance of the wind climate to the economy of a wind power plant.

The other factors are cost of the wind turbines, operation and maintenance and the efficiency of the wind turbines. Over 20 years, improved aerodynamic and structural design tools and production methods have reduced cost of energy—disregarding the wind climate—by 70%. By 1997 the cost of energy at European sites with high wind speeds was 0.03–0.04 USD/kWh, and at "medium-good" wind sites 0.05–0.07 USD/kWh. Reduction in cost of energy becomes increasingly difficult. However, it is expected that the next 30 years will bring a further reduction of 20–30%.

SUMMARY OF THE INVENTION

It is an object of the invention to provide a wind turbine with improved efficiency, reduced static as well as dynamic structural loads, reduced noise, and facilitating grid connection with improved power quality.

According to the present invention the above and other objects are fulfilled by a wind turbine comprising a wind velocity measurement system for determination of air velocities in front of the wind turbine and having an output for provision of determined air velocity values.

The wind velocity measurement system may comprise a laser anemometry system having a laser for emission of a laser light beam for illumination of particles in the air, a detector for detection of light emitted from particles that have interacted with the illuminating laser light, and a signal processor connected to the detector for generating a velocity signal corresponding to the velocity of the particles based on the detected light.

According to a preferred embodiment of the invention, a wind turbine is provided comprising adjustable pitch blades, a pitch controller for setting blade pitch and having an input, the blade pitch being set according to a signal provided at the input, and a control system for controlling the output power generated by the wind turbine by control of blade pitch. The control system may have a control output that is connected to the input of the pitch controller, a velocity input that is connected to the output of the velocity measurement system, and a pitch processor for calculation of the desired blade pitch based on determined air velocity values and generation of a corresponding pitch control signal that is provided at the control output.

It is an important advantage of the invention that the determination of air velocities in front of the wind turbine compensating for delay in blade pitch setting so that the actual blade pitch setting corresponds to the actual wind velocity at the blades during operation of the wind turbine.

According to another embodiment of the invention, a method of wind turbine power curve determination is provided comprising the steps of mounting on the wind turbine a wind velocity measurement system for determination of air velocities in front of the wind turbine, connecting a power measurement system for determination of the output power generated by the wind turbine between a power generator of the wind turbine and a load receiving the power generated by the wind turbine, and recording corresponding values of wind velocity from the wind velocity measurement system and output power from the power measurement system.

According to still another embodiment of the invention, a method of controlling output power from a wind turbine is provided comprising the steps of mounting on the wind turbine a wind velocity measurement system for determination of air velocities in front of the wind turbine and providing determined velocity values to a power control system of the wind turbine.

Figure 1:
FIG. 1 shows a conceptual lay-out for a wind turbine with control based on upstream wind measurements.

Optimisation of wind turbine efficiency—and in turn measurement of the efficiency—includes accurate measurement of wind speed in the immediate vicinity of the wind turbine. A laser anemometer mounted on the wind turbine could serve both purposes possibly with better accuracy than the presently used cup anemometer, see FIG. 1.

Figure 2:
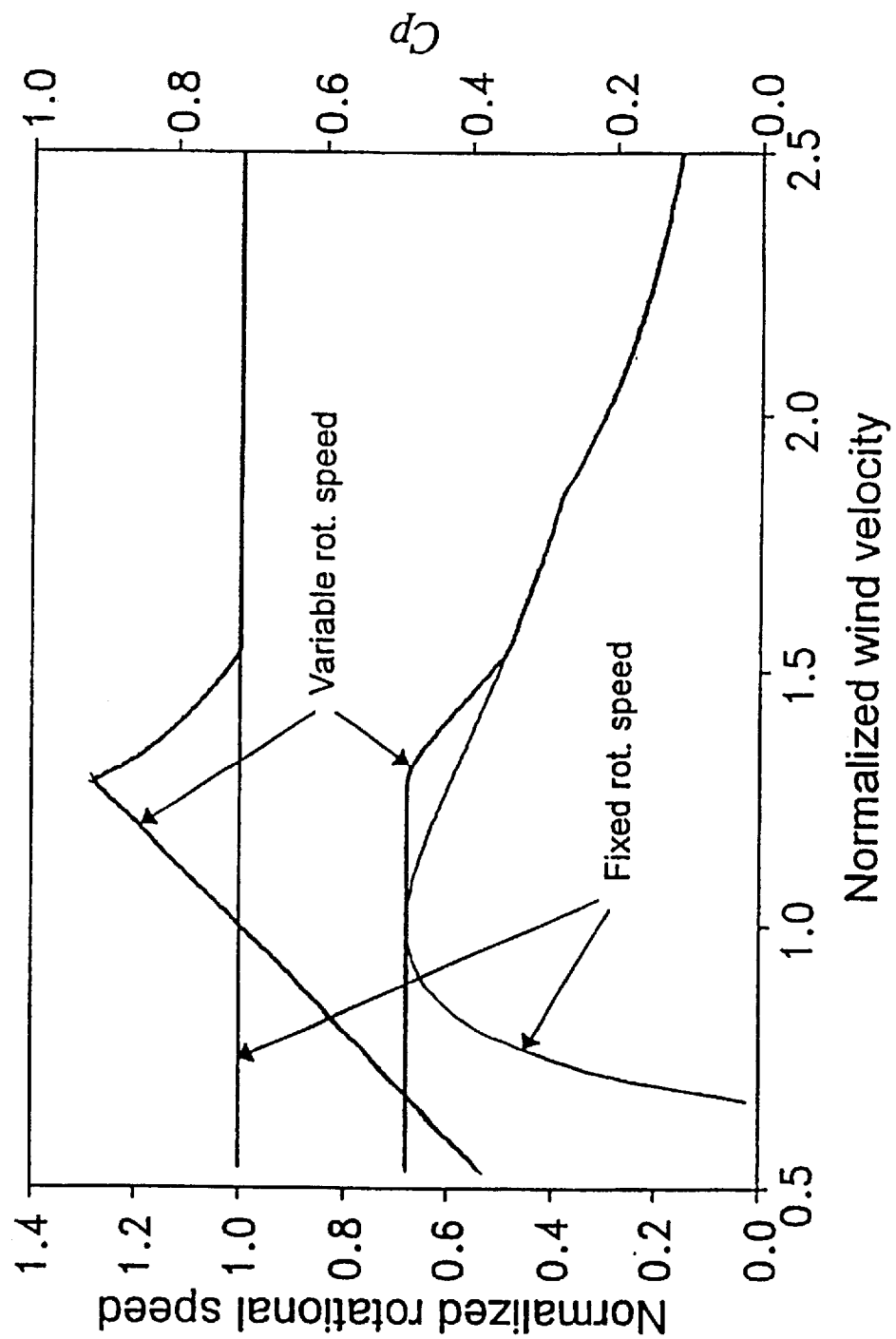
FIG. 2 shows a normalised output power, Cp, (lower traces) for a wind urbine operating at fixed and variable rotational speed, respectively (upper traces)

Wind turbines may have pitchable blades and operating with variable rotational speed of the rotor providing optimal energy extraction and improvement of power quality. Under given flow conditions—mean wind speed, turbulence shear etc. —there is an optimal setting of rotor speed and blade pitch. However, the response time of the wind turbine is several seconds and thus, a short-term prognoses of the flow characteristics is needed. The laser anemometer may potentially deliver such forecast. The characteristics of a wind turbine operating at a constant and variable rotational speed, respectively, is illustrated in FIG. 2. The term $C_p$ is a normalised power output of the wind turbine, defined by the following expression:

$$C_p(u) = \frac{p(u)}{\frac{1}{2}\rho u^3 A_r} \tag{2}$$

where p(u) is the so-called power curve of the wind turbine: the power out as a function of wind speed. The efficiency of fixed-speed wind turbine is a function of wind speed and is maximum only in a narrow wind speed band.

Variable-speed operation will expand the range of high (maximum) efficiency, and the laser anemometer facilitates optimal control of speed with regard to efficiency—and potentially also for structural load and noise reduction.

Further, the laser anemometer facilitates (retrospective) assessment of production capability of wind power plants, being important to the credibility of the wind power technology in the financial world. The measurement of wind turbine efficiency involves measurement of wind speed at approximately 50 m above the ground and 100–200 m upstream, where the flow is undisturbed of the machine itself—FIG. 1. The laser anemometer may measure the wind speed without having to erect a separate tower; in addition, the laser anemometer may provide a spatial average of wind speed and turbulence accurately representing forces on the wind turbine. This would contribute to an improvement of the accuracy of performance assessment of wind power plants.

Below, characteristics are outlined of the boundary layer flow field. Such characteristics are assumed important in determining the performance of a wind turbine and in selecting a strategy (for maximum energy extraction) for the rotational speed of rotor and/or blade pitch angel.

Power output from a wind turbine may be predicted based on knowledge of the wind speed frequency distribution at the wind turbine site and of the so-called power curve of the wind turbine. The frequency distribution shall be given for the wind turbine's hub height, and the power curve is measured with an anemometer elevated to hub height upstream of the wind turbine. In both cases 10 min averages of wind speed (and power) are applied. As the same averaging time is used for both power curve and frequency distribution, the end-result is independent of averaging time. However, in the real world turbulence, flow shear, air density, etc, may be different for the site where the power curve was measured and the site on which the wind turbine is to be positioned. Experience indicates that in fact these parameters are important and uncertainties are introduced when disregarding them.

As stated, when measuring power curves turbulence is disregarded as being of lesser importance. However, in stationary flow with mean U and (for illustration) isotropic turbulence (the flow has identical characteristics in all directions, thus also the same fluctuations in the three directions: $\sigma u = \sigma v = \sigma w$) the kinetic energy in 1 m³ of air is $$E = \frac{1}{2}\overline{\rho(U+u)^2 + v^2 + w^2} = \frac{1}{2}\rho U^2 + \frac{3}{2}\rho\sigma_u^2 \tag{3}$$

where overbar denotes average (note that it is assumed that the air density is constant); the energy flux (power) through an area of 1 m² perpendicular to the mean wind direction is $$P = \overline{(U+u)E} = \frac{1}{2}\rho\overline{[(U+u)^2 = v^2 + w^2](U+u)} \approx \frac{1}{2}\rho U^3(1+5I_u^2), \tag{4}$$

where $I_u = \sigma u/U$ is the turbulence intensity. Thus, for turbulence intensities 10–20% the contribution to "per-m²-energy-flux" from turbulence is 5–20%. More realistically, in the atmosphere, the coefficient to $I_u$ is of the order 3–4 rather than 5 since $\sigma u$ is larger than the other two components. Thus, for turbulence intensities 10–20% turbulence increases the energy flux per m² with 5–15% additional to what is calculated from the mean wind speed alone. Disregarding lateral and vertical components of turbulence the energy flux becomes $$P = \frac{1}{2}\rho\overline{(U+u)^2(U+u)} \approx \frac{1}{2}\rho U^3(1+3I_u^2) \tag{5}$$

Here, the contribution to energy flux from turbulence of 10–20% is 3–12%. Performance data indicate that power output may vary up to 8% for variation in turbulence intensity from under 5% to over 15%. In performance standards, it is presently not taken into account that the energy flux depends on turbulence intensity.

Thus, improvement of the accuracy of performance testing may amongst other things be improved by also measuring the turbulence that the machine is exposed to. To do that a suitably spatial/time average of turbulence must be defined and measured. The laser anemometer facilitates contribute measurement of turbulence.

Evidence points to higher power output when turbulence increases even for fixed-speed machines. If the rotor speed can be varied a larger fraction of the turbulent energy may be extracted, and it may be assumed that a continuous prediction of the instant wind speed—such as supplied by a laser anemometer—may help select the optimal rotor speed at any given time.

Considering the potential improvement of energy extraction by variable-speed operation of the wind turbine, it is useful to investigate the potential gain. The gain may be divided into what is gained by a relative slow regulation (time constant of the order of 10 min) and a faster regulation (time constant of a few seconds).

Usually, climatology wind statistics is based on 10 minute average values of the wind speed. It is interesting how the averaging time influence the estimation of energy flux. Considering only the U-component of the wind field, the annual average per-m2 energy flux is $$P = F_E(k)A^3 = 1/2\rho\Gamma\left(1+\frac{3}{k}\right)8.76A^3 \tag{6}$$

$$= 1/2\rho 8.76 \frac{\Gamma(1+3/k)}{\Gamma^3(1+1/k)} \overline{U}^3 [kWhm^{-2}y^{-1}]$$

where A and k are the Weibull parameters and $F_E$ a function tabulated in Risø Report 1981 by Petersen et al. If the turbulence intensity ($I_u = \sigma_u/U$) is zero, the energy flux is given by eq. 6 applying values of A and k determined from measured 10 minute averages of wind speed. If the turbulence intensity is not zero, the annual energy flux will be under-estimated. The difference in Weibull parameters between 10 minute averages and instantaneous values of wind speed has been evaluated. The relative differences, $\delta A/A$ and $\delta k/k$, respectively, are for small values $$\frac{\delta k}{k} = -\frac{kI_u^2}{2(\psi(1+2/k)-\psi(1+1/k))}, \wedge \frac{\delta A}{A} = \frac{1}{k}\psi\left(1+\frac{1}{k}\right)\frac{\delta k}{k} \tag{7}$$

where $\Psi$ is the digamma function:

$$\psi(x) = \frac{d\ln\Gamma(x)}{dx} \qquad (8)$$

It is seen that $\delta A$ and $\delta k$ are functions of k and Iu. The energy flux neglected when using 10 minute average values is $$\frac{\delta P}{P} = \frac{F_E(k+\delta k) \cdot A^3(k+\delta C) - F_E(k) \cdot A^3(k)}{F_E(k) \cdot A^3(k)} \qquad (9)$$

Figure 3:
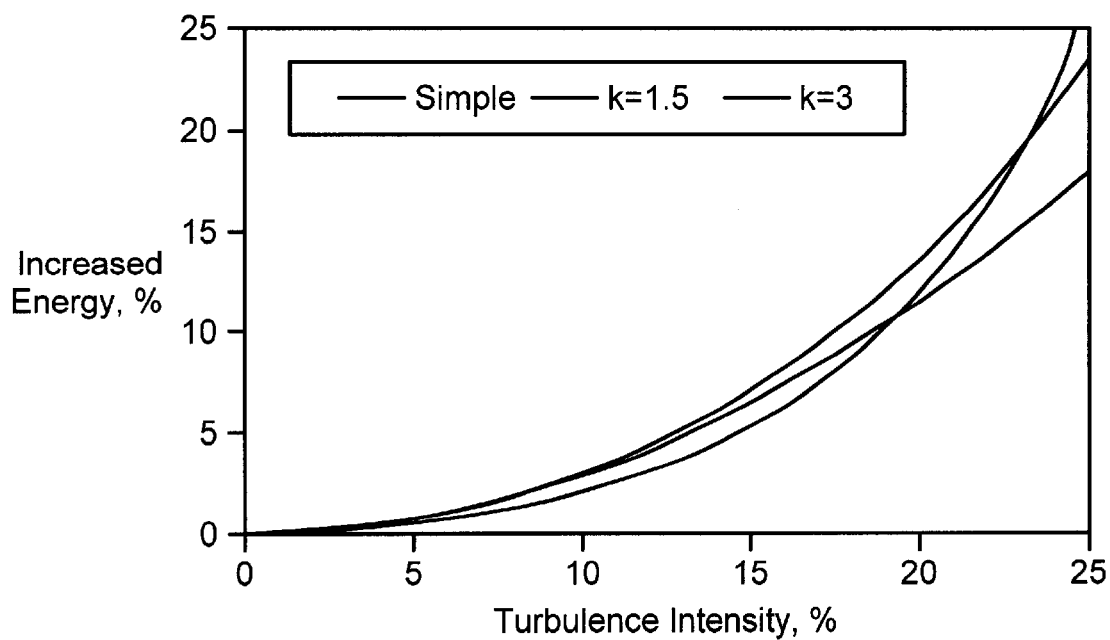
FIG. 3 shows the additional energy due to turbulence.

For the value k=1.5 and 3, the eq. 9 is plotted in FIG. 3 together with the expression of eq. 5.

The points are the increase calculated by means of eq. 9 and the solid line is the simple eq. 5. It is seen that the energy flux increase is only slightly dependent on k and that the eq. 5 gives a good estimate not only in stationary flow but also in the atmospheric boundary layer, of the fraction of energy flux left out when using 10 minute average as a climatological base number.

At realistic turbulence levels of 13 to 18% the energy flux ignored by using 10 minute statistics to calculate frequency distribution parameters is 5 to 10%.

Since the turbulent kinetic energy usually is ignored, the non-constant turbulent kinetic energy appears as an intrinsic uncertainty, e.g. an uncertainty which is not eliminated by improvement of test equipment or duration of test.

Thus, in highly turbulent air flows, the energy flux can not be accurately determined from the mean wind speed only. However, there are other intrinsic contributions to be considered: the wind turbine extract energy from an extended area (the swept area of the rotor), the single-point measurement at hub height may not sufficiently well represent the flux of energy experienced by the rotor. Thus, also horizontal and vertical wind shear and misalignment (yaw error) may cause errors in the power curve measurement. It has been found that shear and yaw error may cause variations in predicted annual energy output of more than 5%.

The largest, present-day wind turbines have two or three blades of lengths up to 40–45 m; the rotational speed of the blades is high, with blade tip speeds of the order 60 m/s. The blade profiles are similar to airplane wing profiles, the purpose of which is to reduce drag and in turn energy conversion losses.

For the ideal rotor—e.i. a rotor with no drag losses and with infinite high rotational speed—operating in a non-turbulent flow, it can be shown that the maximum of the rotor efficiency defined as $$C_p = \frac{P}{1/2\rho u^3 A_r} \qquad (10)$$

(where P is extracted power, $A_r$ the swept rotor area, $\rho$ air density and u wind speed) is $$\max[C_p] = \frac{16}{29} \approx 0.59 \qquad (11)$$

Further, it can be shown (still employing simplest possible theory) that the maximum efficiency is obtained when the flow speed behind the rotor is reduced to $\frac{1}{3}$ of the upstream flow speed and to $\frac{2}{3}$ at the rotor disc. Betz theory is inadequate when dealing with real rotors; however, it does point to the important fact that not only is the flow as measured by the presently used nacelle cup anemometer disturbed by the nacelle itself but the flow speed is inherently linked to the performance of the rotor: e.g the higher performance the lesser wind speed is measured on the nacelle top, implying that the value of this instrument for performance measurements is limited.

Presently, the so-called blade element theory is the method applied for aerodynamic load -and power calculations, though with various auxiliary methods to take into account e.g. turbulence, stall behaviour of the blades and the induction or wake delay. The blade element theory quite accurately models power output and loads under stationary and quasi-stationary conditions when the flow around the airfoils are far from stall. The blade element theory does not account for dynamic flow behaviour. Therefore, to model the time-wise development in aerodynamic power, modifications have to be applied.

Below, the conventional method for power performance measurements is reviewed and intrinsic uncertainties which may be reduced or eliminated by employment of nacelle mounted laser anemometry are pointed out.

Since the IEA recommendation for power performance testing was issued in the late 1970' ies it has been found that actually unacceptable large uncertainties were attached to the tests: even under fairly ideal test conditions is was estimated that the uncertainty could reach a level of 10 to 20%.

Due to lack of a genuine commercial market this fact was not seriously acknowledged until a rapidly increasing commercialisation has hit the wind power industry in the resent few years. In reality, firm contracts between manufacturers and developers now implicitly call for uncertainty levels for performance testing as low as 1–2% in terms of standard uncertainty, which is unrealistic—even though the understanding of the problems has improved.

As of now a "Committee Draft" for power performance testing, IEC 96, has been prepared. The document has not yet obtained the status as an international standard but will probably do so in the near future. The document offers a procedure to be followed when measuring power curves, as well as a method for assessing uncertainties. The method and the proposed uncertainty analysis are outlined below.

While the measured power curve may be used for other purposes, the IEC document is directed toward application to calculation of annual energy production (AEP). The power curve is basically established by collecting pairs of wind speed and power measurements, though also additional measurements are made.

Test site: shall be assessed for sources of flow distortion, mean terrain or other features causing differences in wind speed at the position of the wind turbine and the met tower. At least topographical variations, other wind turbines, and obstacles shall be taken into account in the analysis.

Meteorological tower: shall be placed between 2 and 4 rotor diameters (D) from the wind turbine; more than 2D to avoid stemming disturbances, and less than 4D to maintain good correlation. 2.5D is recommended. Measurements are acceptable for approx. 130° around the case where the wind is from met tower to wind turbine.

Correction factor due to flow distortion: if the test terrain adheres to specified requirements no corrections need to be made and the uncertainty related to flow distortion shall be set to not less than 2–3% depending on separation between met tower and wind turbine. If the test terrain does not adhere to the specified requirements of an ideal test terrain site calibration shall be performed. If a computer model is applied the uncertainty shall be assumed to be ½ of the correction made to wind speed; if measurements used for site calibration the uncertainty is assumed to be ⅓ of the correction.

Electric power: The sensor(s) to measure net electric power shall be of class 0.5 or better.

Wind speed: Shall be measured with a cup anemometer mounted at the wind turbine's hub height $H_h$ "2.5% above the ground in the met tower. It is specified how to mount the instrument so as to avoid flow distortion from the met tower itself. The distance constant of the anemometer shall be less than 5 m/s, the instrument shall be calibrated and the uncertainty stated.

Wind direction: Shall be mounted at $H_h$ "10% in the met tower and the accuracy shall be better than 5%. The purpose of the instrument is to single out data, where the met tower is in the wake of the wind turbine.

Air density: Should be (indirectly) measured at $H_h$ at the met tower, by measurement of pressure and temperature in accordance with ISO 2533.

Precipitation: Shall be monitored to distinguish between wet and dry periods.

Wind turbine status: A parameter indicating whether the wind turbine is ready for operation or not.

Data acquisition system: Sample frequency shall be at least 0.5 Hz. It shall be ensured that uncertainties related to the data acquisition system are negligible compared to other uncertainties.

Measurement procedure: During the measurement the wind turbine shall be in operation and the above parameters shall be sampled at 0.5 Hz or faster. From the data mean values of 10 min periods of consecutive data sets, standard deviation, maximum and minimum shall be computed and stored. At least 180 hours of data shall be collected, and there must be at least 30 min of data in each ½ m/s wind speed bin.

Data correction: The data of the data base must be corrected (calibration errors, site calibration correction etc.)

Data normalisation: Data shall be normalised to two reference air densities: one rounded off to the nearest 0.05 kg/m³ and one to the ISO standard atmosphere 1.225 kg/m³; the precise method is given in the IEC document.

Power curve: The corrected and normalised data are binned in 2 m/s wind speed bins and averages of wind speed and power are formed in each bin. These sets of bin-averaged values of wind speed and power constitute the power curve.

Annual energy production (AEP): The AEP is estimated by applying the measured power curve to annual mean wind speed, assuming the 10 min average wind speeds to be Rayleigh distributed. The AEP is what in metrology is termed the measurand.

Knowledge—or at least awareness—of the component uncertainties and their mutual relations in an experiment is the key to improvement of the test.

A guide to uncertainty analysis, ISO 1993, was issued recently, having all major standard organisations behind it. One of the main points of the guide is to disregard the concept of bias uncertainty and replace it with "correlated uncertainty". Doing so, all uncertainties may be treated equally, e.g. added in the same way, which is a major improvement. However, it somewhat complicates the presentation of the issue.

The true value (the concept of "true value" is also estranged in ISO 1993; it is used in the present disclosure anyway) of the measurand is never exactly known, and therefore determination of the uncertainty is a probabilistic problem, i.e. what is the probability that the true value is found inside the interval $[\mu-\sigma;\mu+\sigma]$, where $\mu$ is the measured value and $\sigma$ is the uncertainty measure? In some cases objective measures of the sought probability exist, i.e. when a stochastic variable is measured (with no instrumental uncertainty) and the measured values are independent and form a Normal Distribution with a mean $\mu$ and a standard deviation $\sigma$, the probability of each measured value being in the interval $[\mu-\sigma;\mu+\sigma]$ is approximately 68%, the mean and standard deviation being estimated from the measurements. In other cases the shape of the distribution and/or the standard deviation may not be explicitly known.

If the distribution is not Normal, the probability attached to the standard deviation may be different. However, in this annex, it is assumed that all uncertainty components are sufficiently accurately characterised by a standard deviation. Further, it is trivial—though important—to note that the standard uncertainty for e.g. a random variable is not identical to standard deviation of the process, $\sigma$. The uncertainty standard deviation is the estimated standard deviation of the final average (binwise or else-wise) of a component in contrast to the standard deviation, $\sigma$, of the parameter.

There are two types of uncertainties. It is assumed that they are only distinguished by the way their magnitudes are determined.

The first type of uncertainty, category A, is characterised by firm knowledge of the uncertainty distribution, e.g. through the data base of the power performance test or tests made prior to the performance test.

The distribution of the measured quantity is assumed Normal and the standard uncertainty is estimated by the expression $$u = \frac{\sigma}{\sqrt{N}} \tag{12}$$

where $\sigma$ is the standard deviation of the measured process and N is the number of observations. Uncertainties of category A are in principle independent of the person who makes the uncertainty estimate, and the uncertainty of the estimate of the mean value can in principle be reduced to any small quantity by repeated measurements.

The second type of uncertainty, Category B, is characterized by no or imprecise knowledge of the uncertainty distribution. Category B uncertainties is estimated by other means than measurements. The uncertainty type would typically be associated with "bias" uncertainty; however, if a bias/one-sided error is identified the data should be corrected. What is left after correction may or may not be biased; in any case the sign is not known.

The (important part of the) uncertainties of instruments is often of Category B: little or no specific information may be available—or a statement of uncertainty limits, for instance "U, is given in data sheets for the instrument. For instruments that are only specified by uncertainty limits, an uncertainty distribution as well as uncertainty standard deviation shall be estimated. Often, a rectangular distribution is chosen. Uncertainties of category B are often based on personal judgment, and consequently they are often dependent on the person who makes the uncertainty analysis. Uncertainties of category B can not be minimized by repeated measurements.

The square of the standard uncertainty of annual energy production (AEP) can in its general form be expressed as $$u_{AEP}^2 = N_h^2 \sum_{i=1}^{N} \sum_{j=1}^{N} \sum_{k=1}^{M} \sum_{l=1}^{M} f_i c_{k,i} u_{k,i} f_j c_{l,j} u_{l,j} \rho_{k,l,i,j} \quad (13)$$

where
$f_i$=relative occurence of wind speed in wind speed bin i,
$u_{k,i}$=standard uncertainty of component k in bin i,
$c_{k,i}$=sensitivity factor of component k in bin i,
M=number of uncertainty components,
N=number of bins,
$N_h$=8760, number of hours per year,
$\rho_{k,l,i,j}$=correlation coefficient between uncertainty component k in bin i and uncertainty component l in bin j.

For all uncertainty components it is assumed in the IEC document that different uncertainty components are uncorrelated, $\rho_{k,l,i,j}$=0 for k≠l.

In addition, for type A uncertainties it is assumed that
Uncertainty components in different bins are uncorrelated, $\rho_{k,l,i,j}$=0 for i≠j.

This implies that the square of the integrated type A uncertainty can be written as $$u_A^2 = N_h \sum_{i=1}^{N} \sum_{k=1}^{M_A} f_i^2 c_{k,A}^2 u_{i,k}^2 \quad (14)$$

where $M_A$ is the number of uncertainty components of type A and $_A u_{i,k}^2$ is the uncertainty of type A, component k in bin no. i.

For category B uncertainties, the additional—possibly conservative—assumption is that bin-wise uncertainties of the same component is fully correlated throughout all bins, $\rho_{k,k,i,j}$=1.

This implies that the square of the integrated type B uncertainty can be written as $$u_B^2 = N_h \sum_{k=1}^{M_B} \left\{ \sum_{i=1}^{N} f_i c_{kB} u_{i,k} \right\}^2 \quad (15)$$

where $M_B$ is the number of uncertainty components of type B and $_B u_{i,k}^2$ is the uncertainty of type A, component k in bin no. i. The motivation for the assumption of the type B uncertainties each being fully correlated over all bins is that a typical type B uncertainty is the uncertainty of an instrument's calibration constant, which presumably remains constant during the test. The total standard uncertainty on annual energy production is $$u_{AEP} = \sqrt{u_A^2 + u_B^2} \quad (16)$$

In performance testing as in many other tests the type A uncertainties are less important since these are reduced any small number if the duration of the test is long enough, Eq. 12. However, the type B uncertainties remain constant once test method, equipment, site etc. have been chosen. Therefore, improvement of the accuracy of performance testing primarily implies reduction of the type B uncertainties.

Below, the uncertainties constituting important error sources are listed and improvements of the performance test provided by the laser anemometer are assessed. What presently appear to be the contributing uncertainties in a performance test is outlined in the table below. The list of uncertainty components may well be incomplete, however it reflects the present knowledge. The characteristics of main groups of uncertainties are outlined in the notes to the table. Typical ranges of uncertainties for each uncertainty component are listed in the table.

The later anemometer appears to be capable of providing improvement options to all uncertainty components, except "obstacles":

Instrumental (anemometer): There are indications that calibration accuracy of (cup) anemometers in wind tunnels at present cannot be made better than 1–2% due to blockage effect and lack of natural turbulence. The cup anemometer measures the horizontal speed, $S=\sqrt{U^2+V^2}$. While in the natural turbulence both U and V are non-zero, in the wind tunnel V=0. Therefore, the conditions of the wind tunnel are intrinsically different from the real world, which introduces an error. The laser anemometer is a "first-principle" instrument, which in principle does not need calibration, and it will basically measure only the U-component of wind speed, presumably the component experienced by the cosine-responding wind turbine propeller.

A wind turbine mounted laser anemometer may facilitate experimental site calibration, both in terms of accuracy and in amount of data gathered within a certain period of time. To apply the laser technology for site calibration the instrument must be capable of measuring (at least) the axial wind speed at selected distances from the wind turbine. Also, with the availability of an operational laser anemometer, site calibration will not be a separate test but an integrated part of the performance test.

Assessing the production capability of a wind farm the power curves are measured on a sample of wind turbines, typically one or two. With the achievable accuracy of the individual power curves, larger samples are needed. However, the per-unit present costs of power curves are high (due to met towers and instruments). A low-cost laser anemometer would make it possible to performance test all units, and thus removing sample uncertainty completely.

Amount of data: The laser anemometer may collect data from a larger range of wind directions and therefore reduce the integrated measuring time or decrease the random (category A) uncertainty.

The benefits of an operational laser anemometer will be
Reduction in direct costs of performance tests.
Reduction of the uncertainty of the individual power curve as well as of the entire wind farm.
Lesser financial costs following the lesser uncertainty of the power curve (investment in wind power plants becomes less risky when output is better predicted; therefore a lower interest rate is asked by investors). With a laser anemometer as standard equipment on (large) wind turbines the logistics of performance (and other) tests will be minimised

| MAIN GROUP | COMPONENT | UERTAINTY |
|---|---|---|
| INSTRUMENTAL (1) | Cup anemometer | |
| | Calibration | |
| | Mounting effects | 1–2% |
| | Operational effects | 0–2% |
| | Power sensor | 0.5–1.5% |
| | Air density | 0.5% |
| | Wind direction | 0.5% |

-continued

| MAIN GROUP | COMPONENT | UERTAINTY |
|---|---|---|
| | Precipitation | — |
| | Data acquisition | — |
| METHOD (2) | Energy flux vs. hub height wind speed (incl. Turbulence) | 1–10% |
| SITE CALIBRATION (3) | Complexity terrain Correction size Regression RMS Wind direction variation Regression offset Distance | 2–4% |
| OBSTACLES (4) | Upstream wind turbines Upstream trees, houses | 0–3% |
| EXTRAPOLATION (5) | Sample uncertainty | Potentially large |
| DATA AMOUNT (6) | Variability, power Variability, site cal. | 0–1% |

(1) Uncertainties directly related to calibration of instruments and their use; Most measurements consist of several measurements in combination.
(2) Refers to the applied method itself (hub height measurements of wind speed in front of rotor etc.); the potential pitfalls are to some extend dealt with in section 3.1.
(3) The present method, IEC 1996, highly relies on methods to re-calculate the wind speed measured at met-tower to wind speed at the wind turbine; with the IEC method site calibration uncertainties are potentially severe though very difficult to quantify.
(4) Analyses, Frandsen 1994, indicate that obstacles (of sizes of the wind turbine) as far away as 1 km may influence the accuracy of the performance test.
(5) When evaluating plants of a larger number of machines, present practice is to test one or two turbines, which leaves sample uncertainty.
(6) For both power variability (power curve measurement) and variability when performing site calibration there are (measurable) uncertainties Table 3.1 Summary of uncertainties in power performance testing. Only uncertainties related to "amount of" data are quantifiable. The indicated uncertainty levels are indicative.

The operation of a wind turbine can be divided in four modes depending on the wind speed:

Below cut-in
cut-in to rated
rated to cut-out
above cut-out.

The behaviour of the wind turbine in the two power production modes depends on its type, whether it is stall-, pitch or pitch/variable speed controlled. Considered here are only pitch and combined pitch and variable speed controlled machines. Both these two kinds of wind turbines apply active control mechanisms for limiting the output power. The same mechanisms can be utilised for production optimisation i.e. operating the wind turbine at maximum Cp.

The basic objective of a control system is to reach a given value of an output signal through manipulation of an input signal. There are two separate ways of controlling a given system: open and closed loop. In the open loop approach the input variable is assigned a value based on a priori knowledge of static characteristics of the controlled system e.g. to have 500 kW from a given wind turbine the wind speed is measured to 15 m/s and then the pitch angle should be 5 deg. and the rotational speed should be 30 rpm based on pre-calculated Cp curves. The actual output is not measured. In the closed loop approach the pitch angle and rotor speed are determined on the basis of measurement of the output power. This ensures that deviations from the assumed characteristics and disturbances are suppressed.

Figure 4:
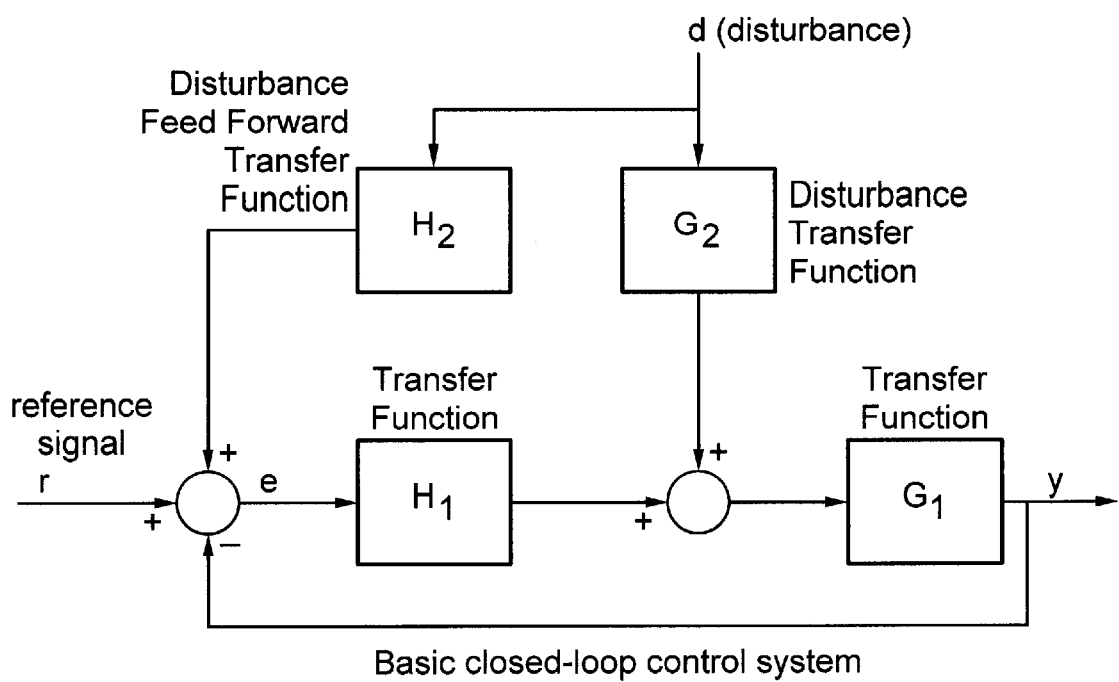
FIG. 4 shows a basic closed-loop control system.

The closed loop performance is limited by several factors. It is seen, in FIG. 4, that if the phase shift through the loop is 180° and the loop gain is above 1 the fed back signal is actually added to the reference signal and the resulting system is therefore unstable. Also in the figure it is shown how a disturbance, d, can be fed forward, through $H_2$, in order compensate for the disturbance before it has changed the output through $G_2$ and $G_1$. It is of course necessary to be able to measure the disturbance if it is to be fed forward.

The output power from a wind turbine has to be limited in order to limit the loads on the various components. The output can be limited e.g. by applying variable pitch and/or variable speed.

Figure 5:
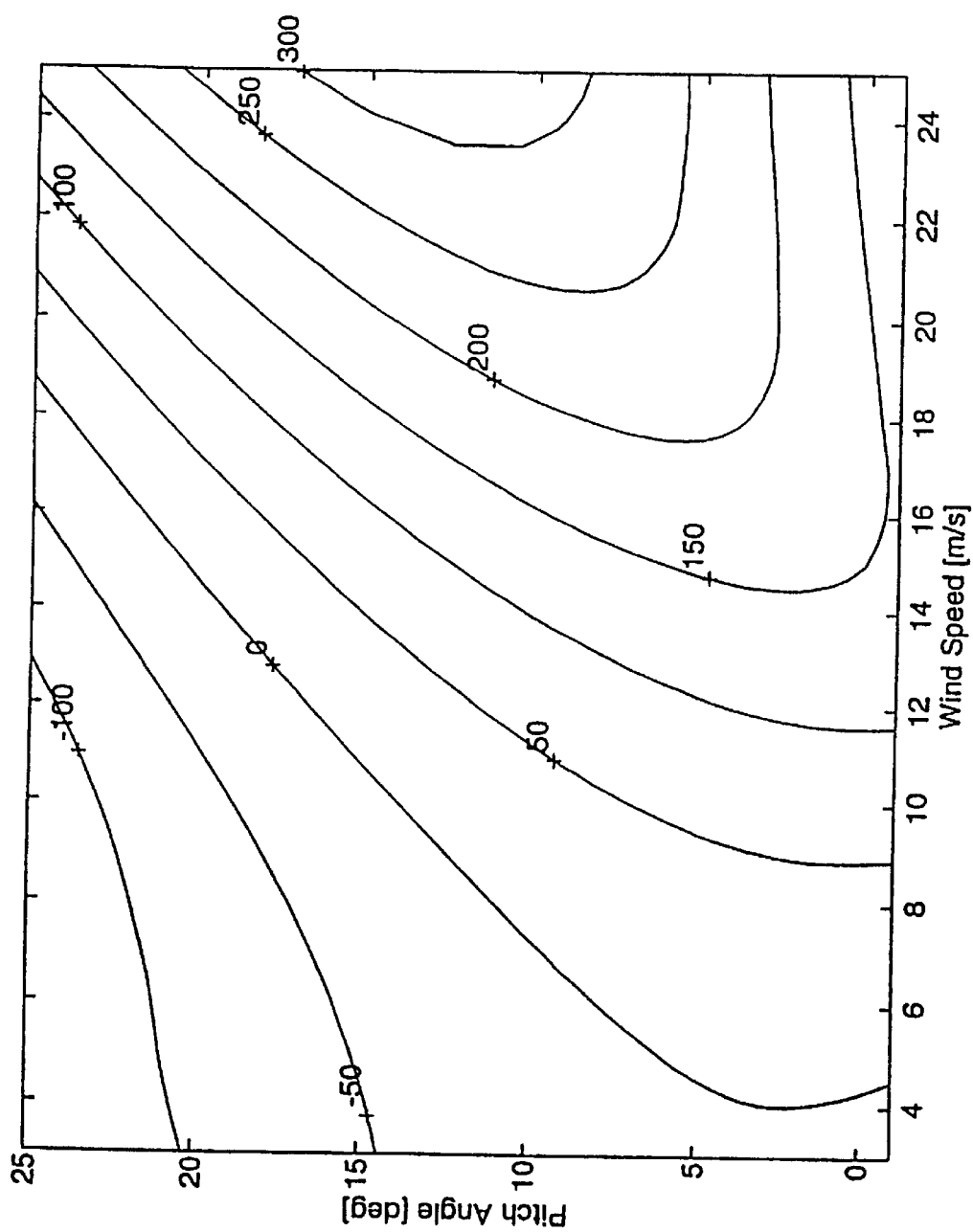
FIG. 5 shows a contour plot of shaft torqueas a function of wind speed and pitch angle (WD34°35 rpm)
Figure 6:
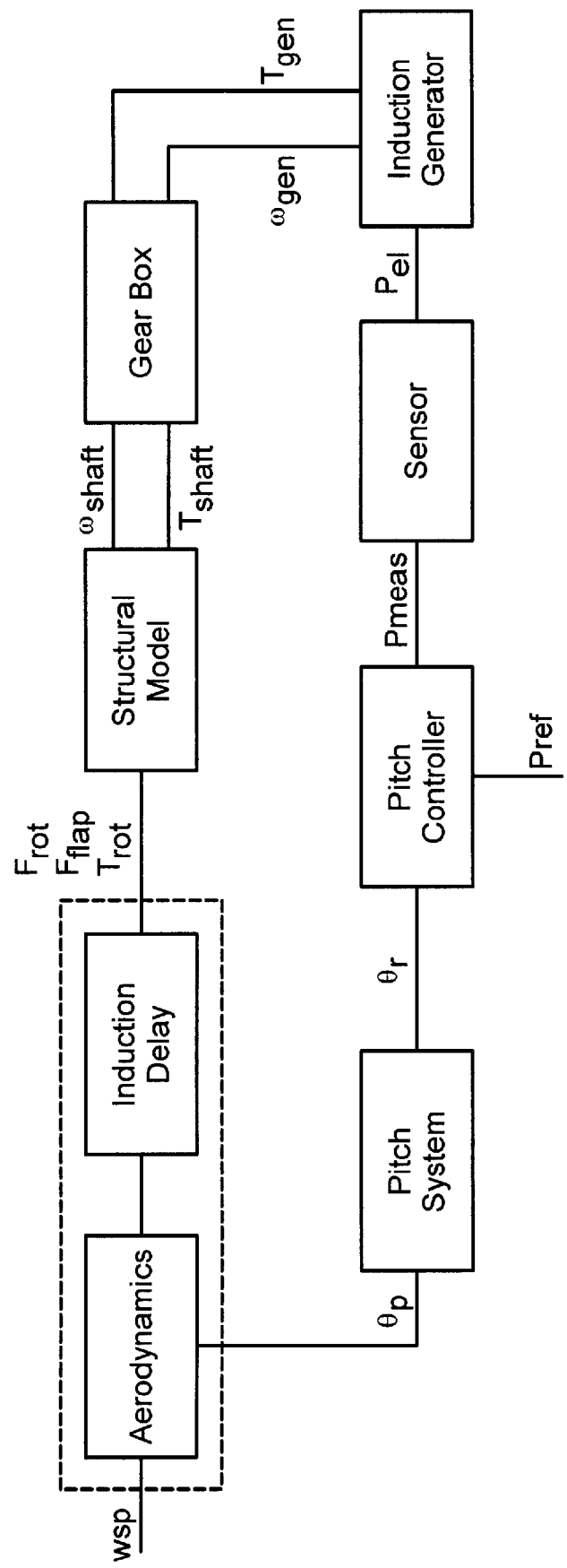
FIG. 6 shows an overview of a wind turbine from a control point of view.

For pitch control the basic control scheme can illustrated as in FIG. 5. The objective of the control system is to keep the torque constant (it is a, constant speed machine), in the current case to keep the torque at 110 kNm for all wind speeds where it is possible.

The setting of the pitch angle is controlled by a controller, typically a PI controller with electrical power as input. The electrical power is used for several reasons. It is among other things the power that has to be limited and it is simple, robust and cheap to measure. From a control point of view the electrical power is a more problematic signal to use. The basic problem is that instant torque on the rotor is determined by the instant pitch angle and the instant wind speed as experienced by the rotor and the power the is used for the control loop is the electrical power that appears after the torque has been converted by the gearbox and the generator. The controller then has to calculate the pitch angle that compensates for the deviation in power production and the pitch system has to move to the desired pitch angle in order to limit the power. Unfortunately the very high sensitivity to wind speed changes and the phase lag resulting from the conversion of wind power electrical power makes it very difficult to obtain a power limiting performance that is adequate.

One of the classical and best ways of improving a control system is to feed forward the signal that causes the disturbance in order to compensate for the effect it will cause before it actually causes it. For the pitch controlled wind turbine looked at here The desired signal to feed forward is the instant wind speed experienced by the rotor. This signal is very difficult to obtain on a standard wind turbine because the anemometer on top of the nacelle is not accurate enough due to the disturbance from the rotor itself and it is not practical to have an array of anemometers in all directions to get an upstream measurement of the wind speed.

Figure 7:
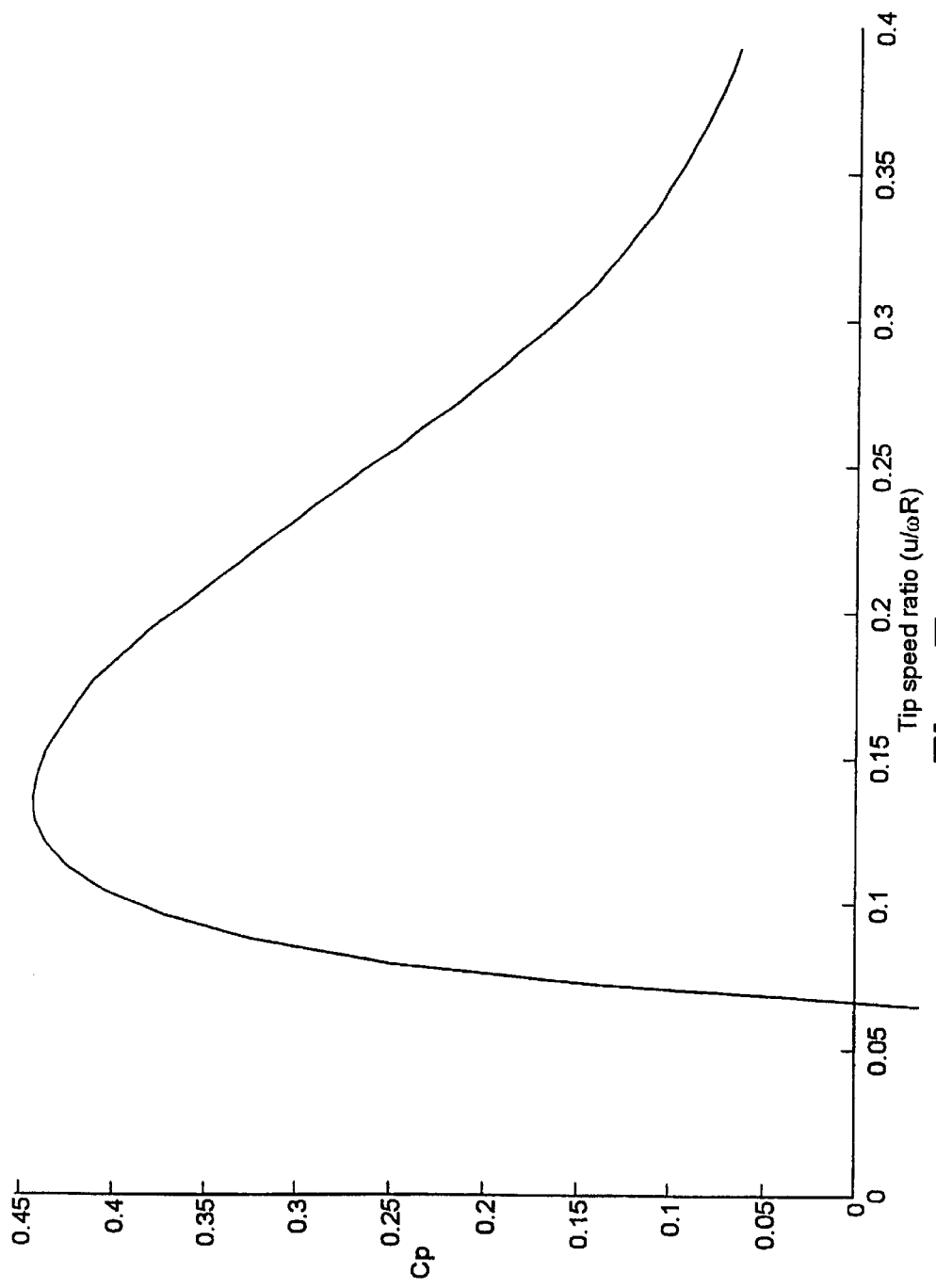
FIG. 7 shows a nomalized output curve, Cp, curve for WD34 for a pitch angle of 1 deg.

The active control scheme can also be utilised for energy production optimisation. The pitch angle or rotor speed is then controlled in order to operate at maximum $C_p$. Various ways of implementing the optimisation are possible but the simplest is to use the wind speed and then, based on steady state characteristics, determine the optimal pitch angle or rotational speed. The principle for a variable speed machine can be illustrated as in FIG. 7. It is desired to operate the rotor at a constant tip speed ratio in order to have maximum efficiency. The tip speed ratio is the ratio between the wind speed experienced by the whole rotor and the rotational speed of the rotor. It is therefore very desirable to know the wind speed.

If the wind speed is to be used for control purposes there are several considerations that has to be taken into account.

It is clear that the better the wind is known the safer it can be fed forward.

The wind speed that is needed for power limit control is the wind speed seen (or to be seen) by the whole rotor. This wind speed is very difficult to obtain, because the wind turbine itself disturbs the flow and the wind speed is measured at one point.

On the current wind turbines the cup anemometer is mounted on the nacelle. The wind speed measured there can not be used as wind speed input for power limit control because the wind speed at the anemometer is disturbed by the rotor itself. Instead of using an anemometer on top of the nacelle a laser anemometer can be used to measure the wind speed at a point (or several points) up stream.

Figure 8:
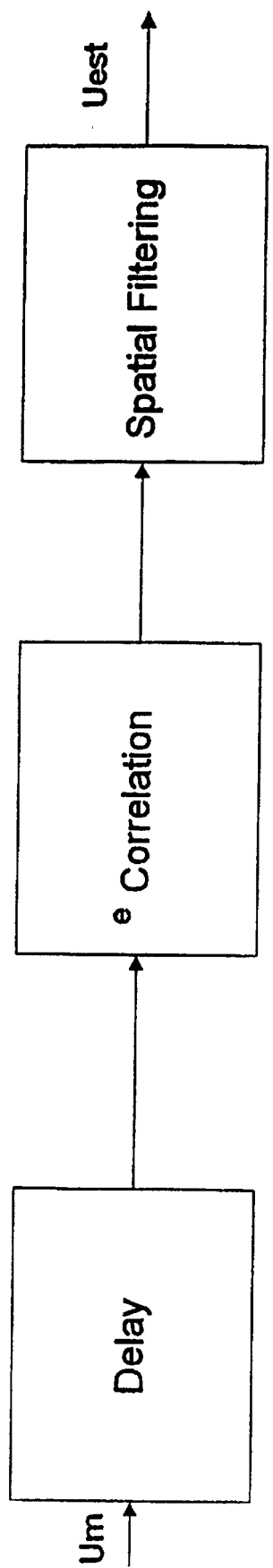
FIG. 8 shows an open loop estimation of wind speed.
Figure 9:
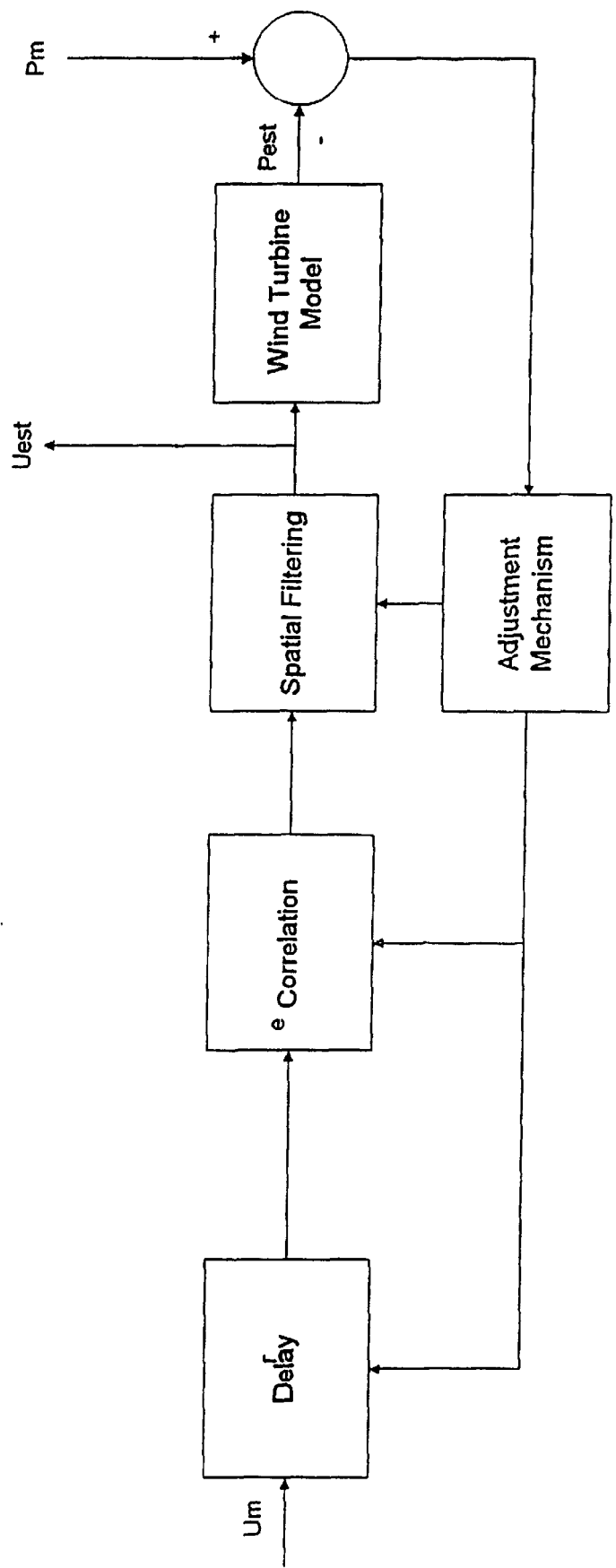
FIG. 9 shows a closed loop estimation of wind speed.
Figure 10:
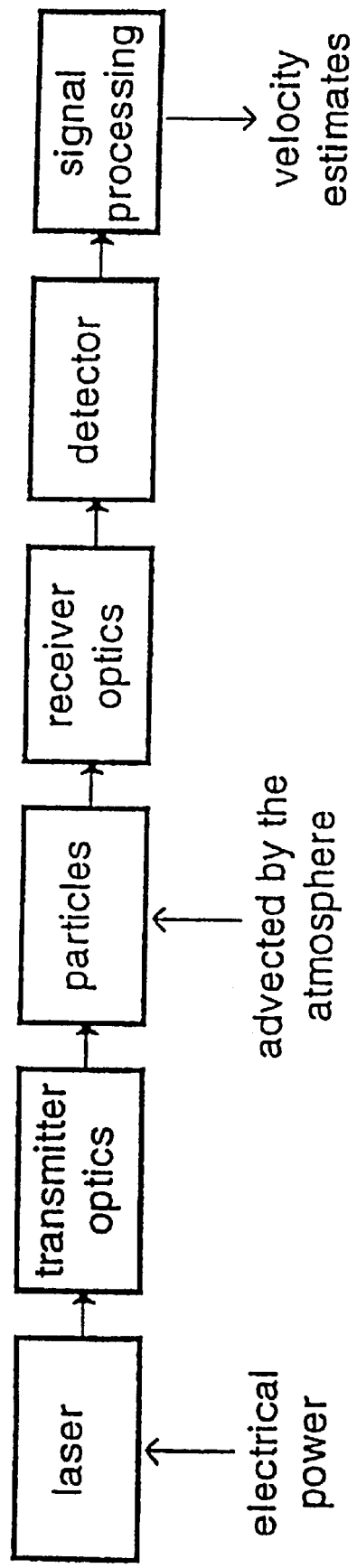
FIG. 10 is a blocked schematic of a laser anemometer system.

The measured wind speed upstream can then be used to predict the wind speed that the rotor will see at some point later in time. The wind speed prediction will have to take the delay, the spatial filtering of the rotor and correlation between the wind speed measured at one point and the wind turbine's position. The estimate of the wind speed can be derived in two ways. It can be done in open loop as in FIG. 8 or it can be done in closed loop as in FIG. 9. The estimated wind speed can then be used in the control algorithm. All the models involved are dynamic. The wind turbine model should be as simple as possible only taking low frequency (~1 Hz) dynamics into account.

Since the final goal of this investigation is to assess, with blade pitch control in mind, the possibility of using the upwind air velocity, measured from the wind turbine, a number of micrometeorological questions have to be answered. If we need five second of time, say, to carry out a change in the pitch, then we must know how well the measured wind speed, perhaps ten rotor diameters upstream, represents the actual wind speed at the rotor five seconds later.

In the following we will address the questions:
1. Eddies of smaller extension than the linear dimensions of the rotor are uncorrelated over these dimensions and of no importance to the overall forcing. Consequently, we must emulate the area averaging of the wind field by the rotor as well as possible in the upwind detection. We assume that this is carried out by a line averaging in the wind direction. What should the length of this line then be?
2. What is the correlation coefficient between the upstream wind speed and the wind speed at the rotor?
3. How do we interpret the correlation coefficient to tell us how well the measured upstream wind speed matches the wind speed at the rotor.

Let the spectral tensor component for the streamwise, unfiltered velocity component $u^0(\chi)$ be $\Phi_{uu}^0(\kappa)$. Then spectral the tensor component of the spatially filtered velocity component $u(\chi)$ will be given by $$\Phi_{uu}(\kappa) = \Xi(\kappa)\Phi_{uu}^0(\kappa), \quad (4.1)$$

where the actual form of $\Xi(\kappa)$ depends on the relation between $u(\chi)$ and $u^0(\chi)$.

In general this relation is given by the integral over the entire physical space $$u(x) = \oint_V u^0(x-x')h(x')d^3x'. \quad (4.2)$$

The volume transfer function $\Xi(\kappa)$ is then given by $$\Xi(\kappa) = |\hat{h}(\kappa)|^2, \quad (4.3)$$

where $$\hat{h}(k) = \oint_V h(x)\exp(ik \cdot x)d^3x. \quad (4.4)$$

To obtain the usual one-dimensional spectrum $F_u(\kappa_1)$ of u as a function of the streamwise component of the wave vector κ, we carry out the double integration over the other two components of κ, viz.

$$F_u(k_1) = \int_{-\infty}^{\infty} dk_2 \int_{-\infty}^{\infty} dk_3 \Phi_{uu}(k) = \int_{-\infty}^{\infty} dk_2 \int_{-\infty}^{\infty} dk_3 \Xi(k)\Phi_{uu}^0(k). \quad (4.5)$$

The corresponding unfiltered one-dimensional spectrum $F_u^0(\kappa)$ is of course given by $$F_u^0(k_1) = \int_{-\infty}^{\infty} dk_2 \int_{-\infty}^{\infty} dk_3 \Phi_{uu}^0(k). \quad (4.6)$$

The one-dimensional transfer function is defined as $$H(k) = \frac{F_u(k)}{F_u^0(k)}. \quad (4.7)$$

In the special case of isotropy we have $$\Phi_{uu}^0(k) = \frac{E(k)}{4\pi} \frac{k_2^2 + k_3^2}{k^4}, \quad (4.8)$$

where E(κ) is the energy spectrum and in this case there is a simple relation between $F_u^0(\kappa)$ and E(κ), namely $$E(k) = k^3 \frac{d}{dk} \frac{1}{k} \frac{dF_u^0}{dk}. \quad (4.9)$$

Figure 19:
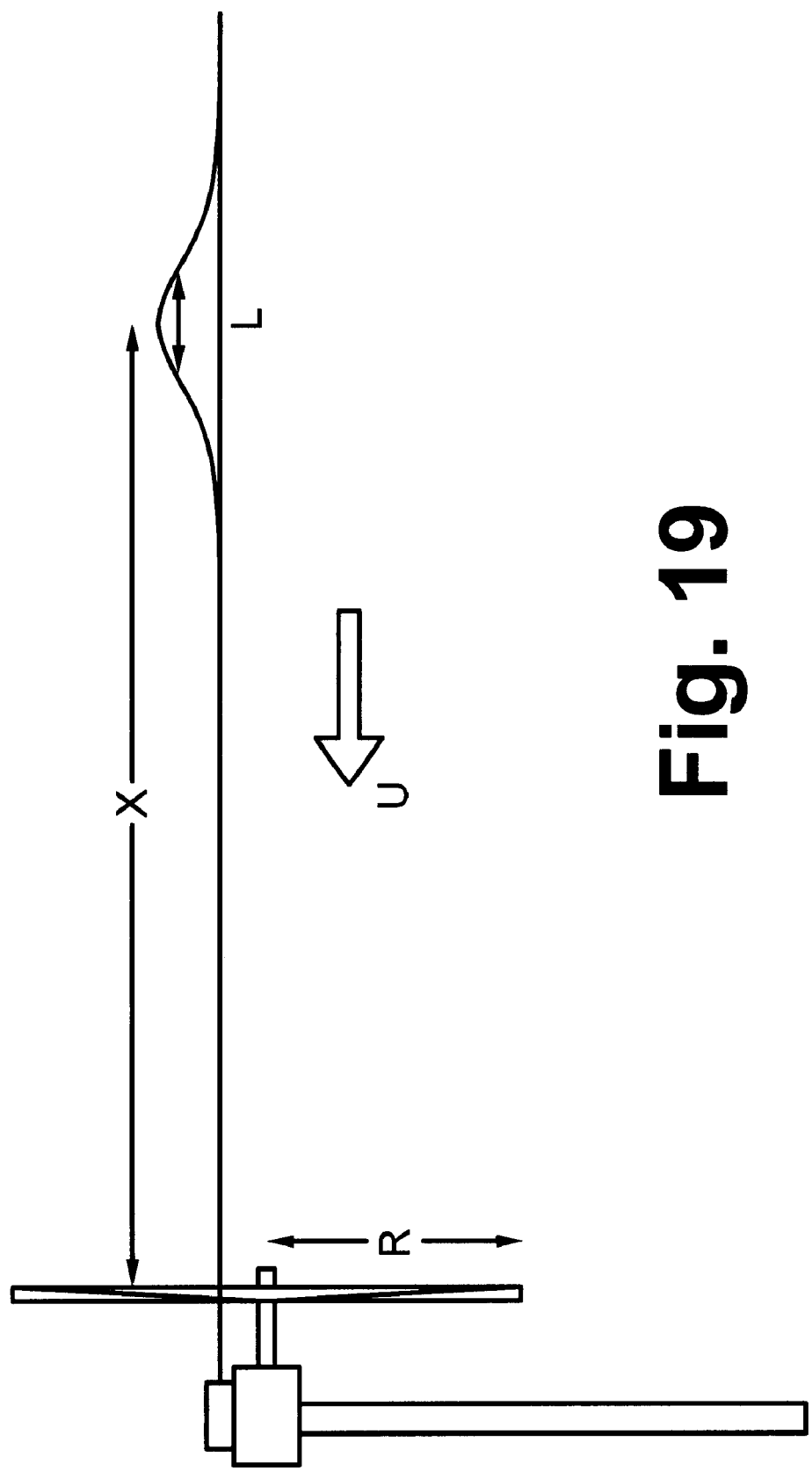
FIG. 19 shows characteristic parameters in conjunction with velocity measurement from a wind turbine.

In this case we assume that $h(\chi)=h_L(\chi)$ is given by $$h_L(x) = \frac{1}{\pi} \frac{L}{L^2 + x_1^2} \delta(x_2)\delta(x_3), \quad (4.10)$$

where L, as indicated in FIG. 19, is the characteristic length of the one-dimensional spatial weighting. Substituting in (4.4), we get $$\hat{h}_L(k) = e^{-|k_1|L}. \quad (4.11)$$

The volume transfer function thus becomes $$\Xi_L(k) = e^{-2|k_1|L}. \quad (4.12)$$

Since $\Xi_L(\kappa)$ is independent of $\kappa_2$ and $\kappa_3$, (4.5), (4.6) and (4.7) imply that the one-dimensional transfer function is equal to $H_L(\kappa)$, i.e.

$$H_L(k_1) = \Xi_L(k) = e^{-2|k_1|L}. \quad (4.13)$$

We now assume that the mean wind and, consequently the $\chi_1$-direction is perpendicular to the rotor of the wind turbine. The spatial weighting function $h(\chi)=h_R(\chi)$ is therefore $$h_R(x) = \delta(x_1) \times \begin{cases} \dfrac{1}{\pi R^2}, & \sqrt{x_2^2 + x_3^2} < R \\ 0, & \sqrt{x_2^2 + x_3^2} \geq R \end{cases} \quad (4.14)$$

where R is the radius of the rotor (see FIG. 19).

We substitute (4.14) in (4.4) which because of the delta function reduces to the double integral $$\hat{h}_R(k) = \oint_{Rotor} \int dx_2 \, dx_3 \frac{\exp(i\{k_2 x_2 + k_3 x_3\})}{\pi R^2}. \quad (4.15)$$

This integral can easily be carried out by using plane polar integration variables:

$$\begin{aligned}
\hat{h}_R(k) &= \frac{1}{\pi R^2} \int_0^R r \, dr \int_0^{2\pi} \exp(ir\{k_2 \cos\varphi + k_3 \sin\varphi\}) \, d\varphi \quad (4.16) \\
&= \frac{1}{\pi R^2} \int_0^R r \, dr \int_0^{2\pi} \exp\left(ir\sqrt{k_2^2 + k_3^2} \cos\varphi'\right) d\varphi' \\
&= \frac{2}{R^2} \int_0^R J_0\left(\sqrt{k_2^2 + k_3^2}\, r\right) r \, dr \\
&= 2 \frac{J_1\left(\sqrt{k_2^2 + k_3^2}\, R\right)}{\sqrt{k_2^2 + k_3^2}\, R},
\end{aligned}$$

where $J_v(s)$ is the Bessel Function of the first kind and of order v.

The volume transfer function $\Xi_R(\kappa)$ is according to (4.3)

$$\Xi_R(k) = 4 \frac{J_1^2\left(\sqrt{k_2^2 + k_3^2}\, R\right)}{(k_2^2 + k_3^2) R^2}. \quad (4.17)$$

Substituting this into (4.5), we obtain the filtered one-dimensional spectrum $F_u^R(\kappa_1)$. In order to be able to carry out the two integrations we must assume a particular form of the spectral tensor component $\Phi_{uu}^0(\kappa)$ and here we assume that the turbulent velocity field is isotropic so that we can use (4.8). The integration could be carried out over $\kappa_2$ and $\kappa_3$, but because of the form of $H_R(\kappa)$ in (4.17) and $\chi_{uu}^{0(\kappa)}$ in (4.8) it is advantageous to change to plane polar integration variables $$\begin{Bmatrix} k_2 \\ k_3 \end{Bmatrix} = K \times \begin{Bmatrix} \cos\theta \\ \sin\theta \end{Bmatrix}. \quad (4.18)$$

$$\begin{aligned}
F_u^R(k_1) &= \int_{-\infty}^{\infty} dk_2 \int_{-\infty}^{\infty} dk_3 \Xi_R(k) \Phi_{uu}^0(k) \quad (4.19) \\
&= \int_{-\infty}^{\infty} dk_2 \int_{-\infty}^{\infty} dk_3 4 \frac{J_1^2\left(\sqrt{k_2^2 + k_3^2}\, R\right)}{(k_2^2 + k_3^2) R^2} \frac{E\sqrt{k_1^2 + k_2^2 + k_3^2}}{4\pi} \frac{k_2^2 + \frac{k_3^2}{(k_1^2 + k_2^2 + k_3^2)^2}} \\
&= \frac{2}{R^2} \int_0^{\infty} J_1^2(KR) \frac{E\left(\sqrt{k_1^2 + K^2}\right)}{(k_1^2 + K^2)^2} K \, dK.
\end{aligned}$$

We cannot carry out the final integration over K without making a specific assumption about the energy spectrum $E(\kappa)$ and here we chose the simplest possible, namely that $$E(\kappa) = \alpha \varepsilon^{2/3} \kappa^{-5/3}, \quad 0 < \kappa < \infty, \quad (4.20)$$

where $\alpha \approx 1.7$ is the dimensionless Kolmogorov constant and $\varepsilon$ the rate of dissipation of specific kinetic energy.

Equation (4.9) implies that $$F_u^0(k) = \frac{9}{55} E(|k|) = \frac{9}{55} \alpha \varepsilon^{2/3} |k|^{-5/3}. \quad (4.21)$$

Substituting (4.20) in (4.19), we get $$\begin{aligned}
F_u^R(k) &= \frac{2}{R^2} \int_0^{\infty} \frac{K J_1^2(KR)}{(k^2 + K^2)^2} \alpha \varepsilon^{2/3} (k^2 + K^2)^{-5/6} \, dK \quad (4.22) \\
&= \alpha \varepsilon^{2/3} R^{5/3} 2 \int_0^{\infty} \frac{s J_1^2(s)}{(k^2 R^2 + s^2)^{17/6}} \, ds \\
&= \frac{9}{55} \alpha \varepsilon^{2/3} |k|^{-5/3} \times H_R(k),
\end{aligned}$$

where $$\begin{aligned}
H_R(k) &\equiv \frac{F_u^R(k)}{F_u^0(k)} = {}_1F_2\left(\frac{3}{2}; \frac{1}{6}, 3; (kR)^2\right) - \\
&\quad (kR)^{5/3} \frac{4}{\sqrt{\pi}} \frac{\Gamma(1/6)\Gamma(7/3)}{\Gamma(11/6)\Gamma(23/6)} {}_1F_2\left(\frac{7}{3}; \frac{11}{6}, \frac{23}{6}; (kR)^2\right),
\end{aligned} \quad (4.23)$$

where ${}_1F_2(a;b,c;\chi)$ is the Generalized Hypergeometric Function.

In the derivation we have assumed uniform weighting over the entire rotor plane. However, since the largest part of the external torque from the wind is located far from the axis, we have also calculated $H_R(\kappa)$ in the case when the spatial weighting over the rotor plane increases with the square of the distance from the rotor axis. Again, it was possible to derive an explicit expression like (4.23), albeit a lot more complicated.

Figure 20:
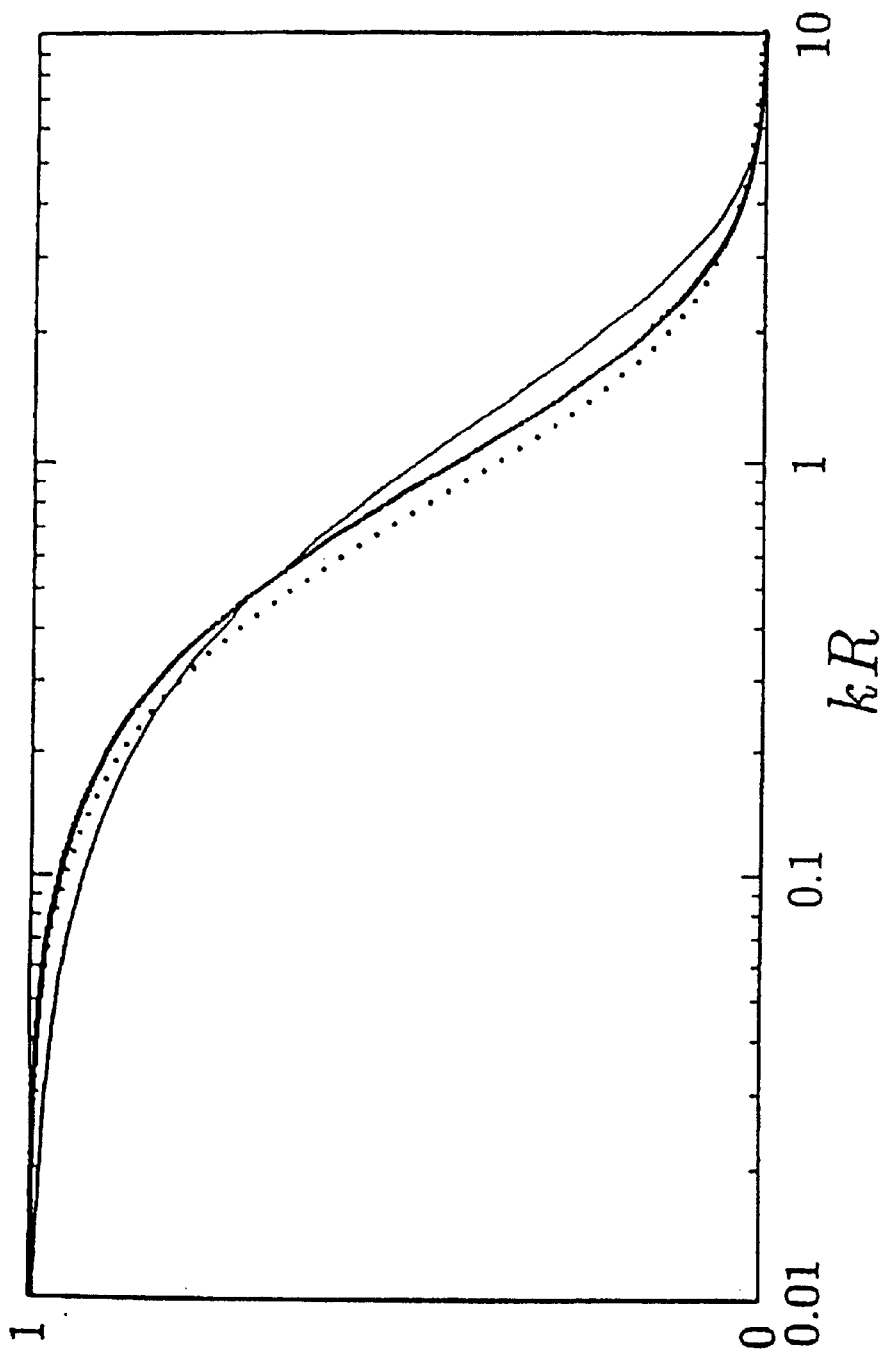
FIG. 20 shows plots of $H_R(k)$ for various weighting functions across the rotor.

FIG. 20 shows $H_R(\kappa)$, given by (4.23) together with a simple exponential expression $\exp(-0.75\kappa R)$. Also shown is $H_R(\kappa)$ in the case when the uniform weighting over the rotor is replaced with a weighting which increased with the square of the distance from the rotor axis.

Assuming that the exponential expression is accurate enough to characterize the area filtering by the rotor, we conclude that the lidar line averaging should have a characteristic length L of about $$L \approx 0.375 R, \quad (4.24)$$

irrespective of the weighting over the rotor plane.

The question about how well correlated the upstream longitudinal velocity component is to the same velocity component just in front of the rotor of the wind turbine will be discussed in terms of the so-called longitudinal velocity coherence. If Taylor's hypothesis were strictly valid this coherence would be exactly one and we would expect perfect correlation. However, Taylor's hypothesis is of course only approximately true and we must consequently move a little outside the realm of standard assumptions when we deal with the longitudinal coherence.

From an experimental point of view, deviations from unity longitudinal coherence are difficult to determine. The reason is that, even when making a strong effort, the line between the two observations points will in general only by coincidence be sufficiently close to mean-wind direction during the observation period. This direction is known only after the measurements have been carried out and if there is just a small angle between the mean-wind vector and the separation line between the anemometers the measured coherence will be dominated by lateral coherence which falls off with frequency much faster than the longitudinal coherence. We will therefore first make an attempt to understand the longitudinal coherence and the corresponding correlation on basis of a simple, semi-quantitative model and then estimate the contamination from lateral coherence due to misalignment.

Consider the covariance $$R_u(X,\tau)=\langle(u(\chi,t)-U)u(\chi+X, t+\tau))-U)\rangle, \qquad (4.25)$$

where $u(\chi,t)$ is the instantaneous wind-velocity component along the mean-wind direction at point $\chi$ and time t, $U=\langle u(\chi,t)\rangle$ the mean-wind speed, X the separation vector and $\tau$ the time lag. Then the cross-spectrum is $$\chi_u(X, \omega) = \frac{1}{2\pi}\int_{-\infty}^{\infty} R_u(X, \tau)e^{-i\omega\tau}d\tau \qquad (4.26)$$

and the coherence defined as $$coh_u(X, \omega) = \left|\frac{\chi_u(X, \omega)}{\chi_u(0, \omega)}\right|^2. \qquad (4.27)$$

This definition is general and can be used irrespective of the orientation of the separation vector X.

In the case when X is along the mean-wind direction, i.e. $X=Xi_1$, Taylor's hypothesis implies $$R_u(Xi_1, \tau) = R_u\left(0, \tau - \frac{X}{U}\right) \qquad (4.28)$$

and, when substituting this in (4.26), we obtain $$\chi_u(Xi_1, \omega) = \frac{1}{2\pi}\int_{-\infty}^{\infty} R_u\left(0, \tau - \frac{X}{U}\right)e^{-i\omega\tau}d\tau = e^{-i\frac{X}{U}\omega}\chi_u(0, \omega). \qquad (4.29)$$

We see that there is only a phase difference between $\chi_u(Xi_1,\omega)$ and $\chi_u(0,\omega)$. Consequently the coherence, defined by (4.27), must be one, irrespective of the frequency, in cases where we assume Taylor's hypothesis.

Another way of stating this consequence of Taylor's hypothesis is to interpret (4.28) and note that $u((\chi+X)i_1, t)$ is perfectly correlated with $u(\chi i_1, t-X/U)$= the upstream, streamwise velocity component at a time so much earlier as it takes a disturbance to travel the distance X with the speed U. In other words, $$\langle\{u(xi_1, t-\frac{X}{U})-U\}\{u([x+X]i_1, t)-U\}\rangle = R_u\left(Xi_1, \frac{X}{U}\right) \qquad (4.30)$$

$$= R_u(0, 0) = \sigma_u^2,$$

where $\sigma_u^2$ is the variance of u.

We will modify (4.29) to account for the decorrelation due to the turbulence by the generalization (Kristensen, 1979)

$$\chi_u(Xi_1, \omega) = \exp\left(-\frac{X}{UT(\omega)}\right)e^{-i\frac{X}{U}\omega}\chi_u(0, \omega), \qquad (4.31)$$

where the exponential 'decay factor' is a decreasing function of X. The 'eddy mean-lifetime'$\tau(\omega)$ is assumed to be a function of the eddy size $\lambda\sim 2\pi U/\omega^\dagger$.

$^\dagger$Actually we cheat a little here and in the following and use Taylor's hypothesis to translate eddy size or reciprocal wave number to frequency $\omega$.

Mann (1994) found that $$T(\omega) = \Gamma\kappa\frac{z}{u_*}\left(\frac{|\omega|}{U}z\right)^{-2/3}\left\{{}_2F_1\left(\frac{1}{3}, \frac{17}{6}; \frac{4}{3}; -\left[\frac{|\omega|}{U}z\right]^{-2}\right)\right\}^{-1/2}, \qquad (4.32)$$

where $\Gamma\approx 3$ is a dimensionless constant, $\kappa\approx 0.4$ the von Karman constant, u. the friction velocity and z the height, brings his spectral model in good agreement with experimental data over land and over water.

for very numerically very small and very large values of $\omega/U$ we have $$T(\omega) = \Gamma\kappa\frac{z}{u_*}\times\begin{cases}\sqrt{\frac{2}{3B\left(\frac{3}{2}, \frac{4}{3}\right)}}\left(\frac{|\omega|}{U}z\right)^{-1} \approx 1.2\left(\frac{|\omega|}{U}z\right)^{-1}, & |\omega|\to\infty \\ \left(\frac{|\omega|}{U}z\right)^{-2/3}, & |\omega|\to 0,\end{cases} \qquad (4.33)$$

where $$B(x, y) = \frac{\Gamma(x)\times\Gamma(y)}{\Gamma(x+y)} \qquad (4.34)$$

is the (Complete) Beta Function.

As we are concerned with rather large eddies, we shall use the asymptote $$T(\omega) \approx 1.5\frac{z}{u_*}\left(\frac{\omega}{U}z\right)^{-1}. \qquad (4.35)$$

All we now have to do to determine the correlation coefficient with longitudinal separation $$\rho(Xi_1) = \frac{R_u\left(Xi_1, \frac{X}{U}\right)}{\sigma_u^2} \qquad (4.36)$$

is to apply the transform $$R_u(Xi_1, \tau) = \int_{-\infty}^{\infty}\chi_u(Xi_1, \omega)e^{i\omega\tau}d\omega, \qquad (4.37)$$

with $\tau=X/U$, to $\chi_u(Xi_1,\omega)$ given by (4.31):

$$R_u\left(Xi_1, \frac{X}{U}\right) = \int_{-\infty}^{\infty}\exp\left(-\frac{2}{3}\frac{u_*}{U}\frac{X}{z}\left\{\frac{\omega}{U}z\right\}\right)\chi_u(0, \omega)d\omega \qquad (4.38)$$

$$= \int_{-\infty}^{\infty}\exp\left(-\frac{2}{3}\frac{u_*}{U}\frac{X}{z}kz\right)F_u(k)dk,$$

where $F_u(\kappa)$ is defined by (4.5).

We assume, according (see FIG. 20) that $$F_u(\kappa)=e^{-0.75\kappa R}F_u^0(\kappa) \qquad (4.39)$$

and we will use the von Kármán spectrum with a length scale equal to z, consistent with Mann (1994), i.e.

$$F_u^0(k) = \frac{\sigma_u^2}{B(1/2, 1/3)} \frac{z}{(1 + (kz)^2)^{5/6}}. \quad (4.40)$$

Further, we will assume that the rotor radius R is half the hub height z.

$$E(k) = \frac{2}{3} \frac{\sigma_u^2 z}{B(3/2, 4/3)} \frac{(kz)^4}{(1 + (kz)^2)^{17/6}}. \quad (4.44)$$

The spectral tensor component can be written $$\Phi_{uu}^0(k) = \frac{1}{6\pi} \frac{\sigma_u^2 z^3}{B(3/2, 4/3)} \frac{(k_2^2 + k_3^2)z^2}{\{1 + (k_1^2 + k_2^2 + k_3^2)z^2\}^{17/6}}. \quad (4.45)$$

The covariance of the two unfiltered velocity components with the lateral separation Xα becomes $$R_u^0(X\alpha i_2) = \oiint \int \Phi_{uu}^0(k) e^{ik_2 X\alpha} d^3k \quad (4.46)$$

$$= \frac{1}{6\pi} \frac{\sigma_u^2 z^3}{B(3/2, 4/3)} \int_{-\infty}^{\infty} dk_1 \int_0^{\infty} K\, dK$$

$$\int_0^{2\pi} d\phi K^2 z^2 \frac{\exp(iKX\alpha\cos\phi)}{\{1 + (k_1^2 + K^2)z^2\}^{17/6}}$$

$$= \frac{2}{3} \frac{\sigma_u^2}{B(3/2, 4/3)} \int_0^{\infty} \frac{dt}{(1 + s^2 + t^2)^{17/6}} \int_0^{\infty} J_0\left(\frac{X\alpha}{z}s\right) s^3 ds$$

$$= \frac{8}{9} \sigma_u^2 \int_0^{\infty} J_0\left(\frac{X\alpha}{z}s\right) \frac{s^3}{(1 + s^2)^{7/3}} ds = \sigma_u^2 \rho^0(X\alpha i_2),$$

Substituting in (4.38), we get $$R_u\left(Xi_1, \frac{X}{U}\right) = \frac{2\sigma_u^2}{B(1/2, 1/3)} G\left(\frac{1}{3} \frac{u_*}{U} \frac{X}{R} + \frac{3}{8}\right), \quad (4.41)$$

where $$G(\xi) = \int_0^{\infty} \frac{e^{-\xi s}}{(1 + s^2)^{5/6}} ds \quad (4.42)$$

$$= 3\xi_1 F_2\left(1; \frac{7}{6}, \frac{3}{2}; -\left\{\frac{\xi}{2}\right\}^2\right) - \frac{\pi^{3/2}}{\Gamma(5/6)} \left(\frac{\xi}{2}\right)^{1/3} Y_{-1/3}(\xi),$$

where $Y_\nu(s)$ is the Bessel Function of the second kind and of order v. is We can now determine the correlation coefficient $\rho(Xi_1)$:

$$\rho(Xi_1) = \frac{R_u\left(Xi_1, \frac{X}{U}\right)}{R_u(0, 0)} = \frac{G\left(\frac{1}{3} \frac{u_*}{U} \frac{X}{R} + \frac{3}{8}\right)}{G\left(\frac{3}{8}\right)}. \quad (4.43)$$

Figure 21:
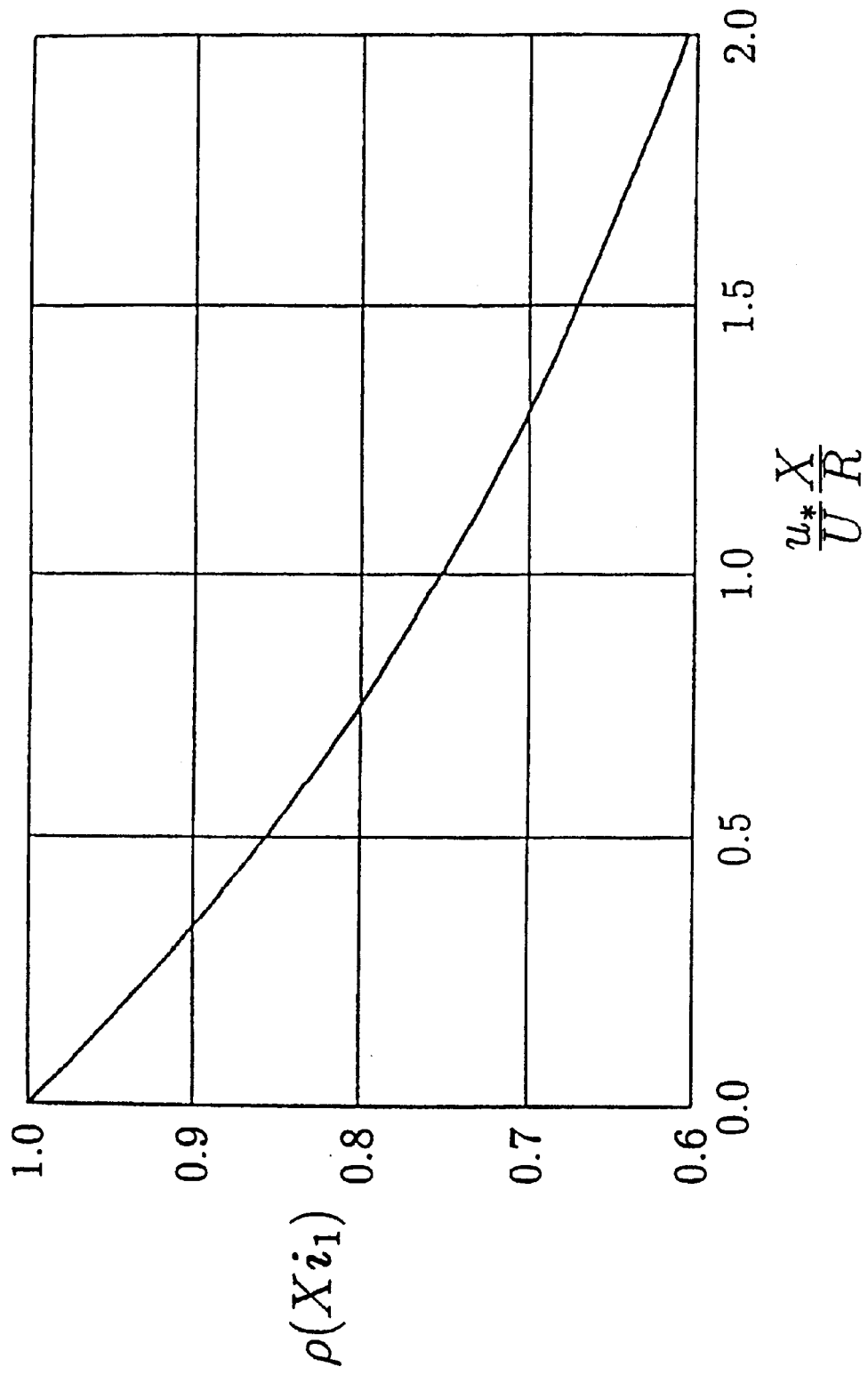
FIG. 21 shows a plot of the correlation function $\sigma(Xi_1)$.

The correlation function is shown in FIG. 21.

If the normal to the rotor plane, the direction of the yaw, is not parallel to the mean wind direction, a gust detected at the distance X will not travel along the yaw direction and will therefore not hit the center of the rotor. The correlation will consequently not be perfect between the upstream wind velocity and the velocity at the rotor at the time X/U later. Let the angle between the yaw direction and the mean-wind direction be α. Then, assuming Taylor's hypothesis, the correlation in question is that between velocity components laterally separated the distance X tan(α)≈Xα. By simple modelling we can estimate this correlation and we will consider both point velocities and velocities which are averaged over the rotor plane. We start with point velocities.

The spectral tensor component for the longitudinal velocity is given by (4.8) and here we use the energy spectrum which can be derived from the von Kármán spectrum and the relation (4.9):

where $\rho^0(X\alpha i_2)$ is the correlation function, given by $$\rho^0(X\alpha i_2) = \quad (4.47)$$

$$\frac{8}{9} \sigma_u^2 \left\{ \frac{1}{\Gamma(4/3)} \left(\frac{X\alpha}{2z}\right)^{1/3} K_{1/3}\left(\frac{X\alpha}{z}\right) - \frac{1}{\Gamma(7/3)} \left(\frac{X\alpha}{2z}\right)^{4/3} K_{4/3}\left(\frac{X\alpha}{z}\right) \right\},$$

where $K_\nu(s)$ is the a Modified Bessel Function (convergent for s→∞) of order v. Here and in the following we consider the typical situation where the hub height is twice the radius of the rotor, i.e. z=2R. The last result can therefore be written $$\rho^0(X\alpha i_2) = \quad (4.48)$$

$$\frac{8}{9} \sigma_u^2 \left\{ \frac{1}{\Gamma(4/3)} \left(\frac{X\alpha}{4R}\right)^{1/3} K_{1/3}\left(\frac{X\alpha}{2R}\right) - \frac{1}{\Gamma(7/3)} \left(\frac{X\alpha}{4R}\right)^{4/3} K_{4/3}\left(\frac{X\alpha}{2R}\right) \right\}.$$

When the velocity signal is averaged over the rotor we must replace $\Phi_{uu}^0(\kappa)$ by $$\Phi_{uu}(k) = 2^5 \frac{2}{3\pi} \frac{\sigma_u^2 R^3}{B(3/2, 4/3)} \frac{J_1^2\left(\sqrt{k_2^2 + k_3^2}\, R\right)}{\{1 + 4(k_1^2 + k_2^2 + k_3^2)R^2\}^{17/6}}. \quad (4.49)$$

The covariance becomes $$R_u(X\alpha i_2) = \oiint \int \Phi_{uu}(k) e^{ik_2 X\alpha} d^3k \quad (4.50)$$

$$= 2^5 \frac{2}{3\pi} \frac{\sigma_u^2 R^3}{B(3/2, 4/3)} \int_{-\infty}^{\infty} dk_1 \int_0^{\infty} K\, dK$$

$$\int_0^{2\pi} d\phi J_1^2(KX\alpha) \frac{\exp(iKX\alpha\cos\phi)}{\{1 + 4(k_1^2 + K^2)R^2\}^{17/6}}$$

$$= 2^6 \frac{4}{9} \sigma_u^2 \int_0^{\infty} \frac{J_1^2(s) J_0([X\alpha/R]s)}{\{1 + 4s^2\}^{7/3}} s\, ds.$$

Figure 22:
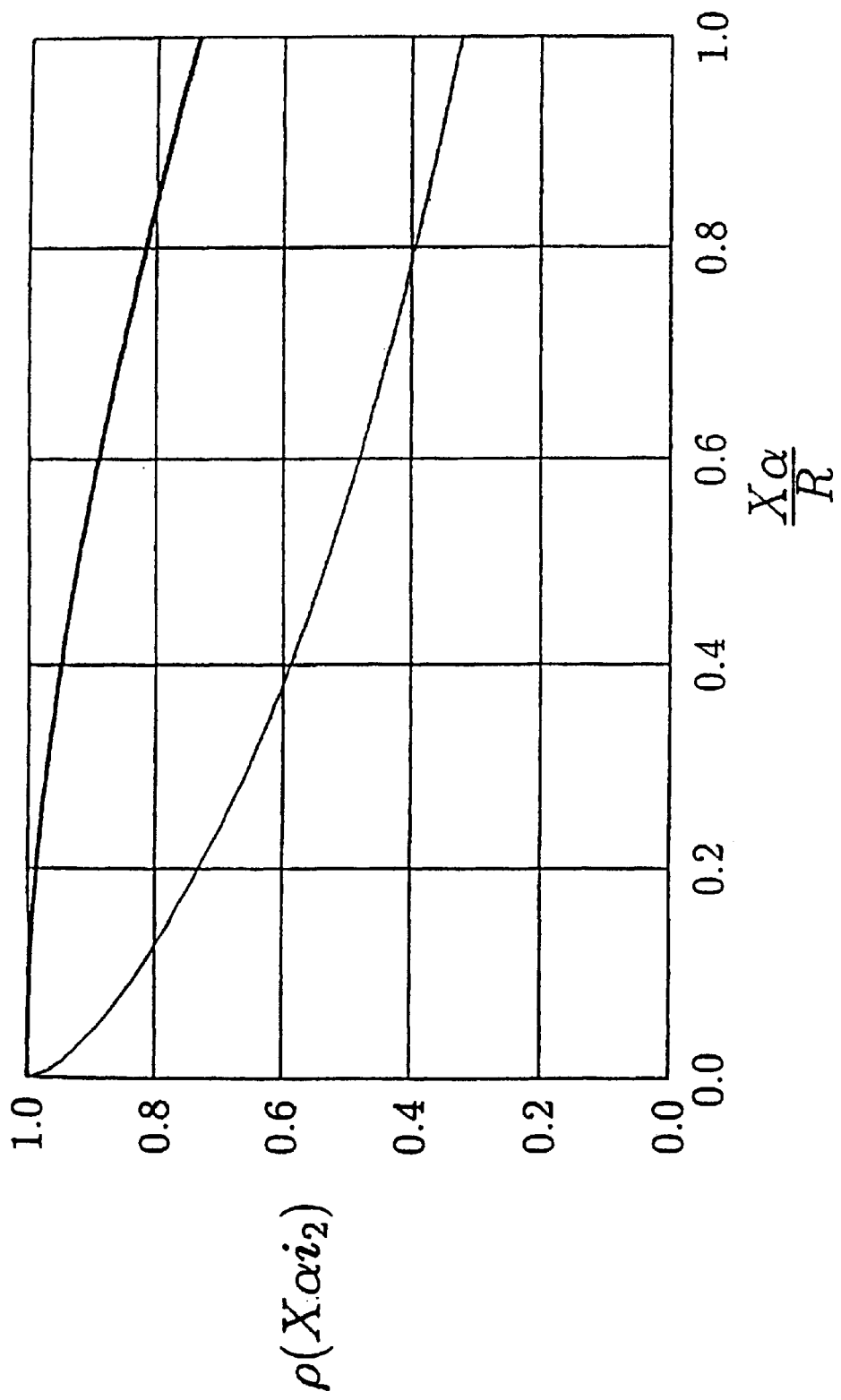
FIG. 22 shows a plot of the correlation function $\sigma^0(X\alpha i_2)$.

The correlation coefficient $$\rho(X\alpha i_2) = \int_0^\infty \frac{J_1^2(s)J_0([X\alpha/R]s)}{\{1+4s^2\}^{7/3}} s\,ds \bigg/ \int_0^\infty \frac{J_1^2(s)}{\{1+4s^2\}^{7/3}} s\,ds \quad (4.51)$$

can be evaluated by numerical integration as a function of $X\alpha/R$. FIG. 22 shows the correlation when the velocity is unfiltered and when it is area filtered.

Until now we have only discussed the correlation coefficient $\rho_0$ between the upstream velocity and the velocity at the wind turbine. It seems tempting to assume that if $\rho_0$ is close to one then a large turbulent excursion of the upstream velocity will give rise to an excursion which is similar in shape and magnitude at the wind turbine at a time $X/U$ later. How can this assumption be quantified?

Let us call the upstream velocity $u_1$ and the velocity at the turbine u. Let the variance $\sigma_u^2$ and the correlation coefficient $\rho_0$ be given, and let us assume that $u_1$ and u have a joint Gaussian probability density $$P(u_1, u) = \frac{\exp\left(-\frac{1}{2(1-\rho_0^2)\sigma_u^2}\{u_1^2 - 2\rho_0 u_1 u + u^2\}\right)}{2\pi\sqrt{1-\rho_0^2}\,\sigma_u^2}. \quad (4.52)$$

We may recast this expression as a product of the probability density function $\rho_0(u_1)$ for $u_1$ and the conditional probability density $P_1(u_1;u)$ for u. We are particular interested in $P_1$ which becomes $$P_1(u_1; u) = \frac{1}{\sqrt{2\pi}\sqrt{1-\rho_0^2}\,\sigma_u} \exp\left(-\frac{(u-\rho_0 u_1)^2}{2(1-\rho_0^2)\sigma_u^2}\right). \quad (4.53)$$

We see from this expression that the conditional mean value of u is $\rho_0 u_1$ and not $u_1$. The implication is that if $\rho_0 < 1$, the mean (and the most probable) value of the velocity u at the wind turbine is less than $u_1$ if $u_1$ is positive. A given upstream excursion will be suppressed on its way to the wind turbine.

Since u is biased in such a way that its most probable value is $u_0 = \rho_0 u_1$, it seems reasonable to use this value for controlling the rotor. Consequently, we may ask the question: what is the probability $\psi_1$ that $|u-u_0|/|u_0|$ is less than a small positive number $\in$?

Figure 23:
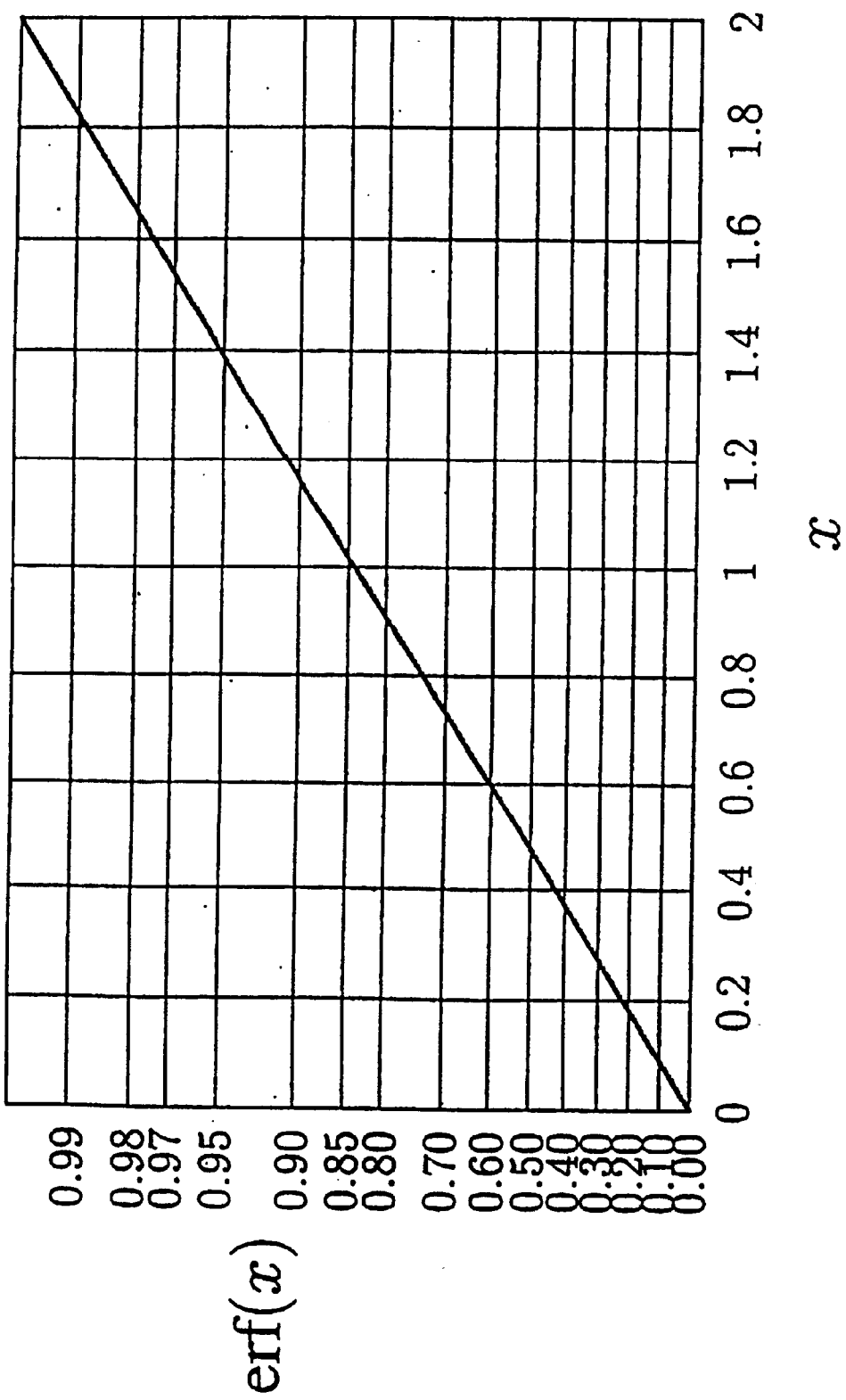
FIG. 23 shows a plot of the error function erf(x).

This probability will depend on $\rho_0$, $\in$ and the excursion in units of the standard deviation $u_0/\sigma_u$.

$$\psi_1\left(\rho_0, \epsilon, \frac{u_0}{\sigma_u}\right) = \int_{u_0-\epsilon|u_0|}^{u_0+\epsilon|u_0|} P_1(u_1, u)du \quad (4.54)$$

$$= erf\left(\frac{\epsilon}{\sqrt{2(1-\rho_0^2)}}\frac{|u_0|}{\sigma_u}\right),$$

where $$erf(x) = \frac{2}{\sqrt{\pi}}\int_0^x e^{-s^2}ds \quad (4.55)$$

is the Error Function, shown in FIG. 23.

When $\chi > 2$, the Error Function can conveniently be approximated by $$erf(x) \approx 1 - \frac{e^{-x^2}}{\sqrt{\pi}\,x}. \quad (4.56)$$

We might get a better estimate of the excursion u at the wind turbine if we measured the wind speed at several places upstream (a range-gating system). Let us assume that we measure the wind speeds at two upstream positions and detect the excursions $u_1$ and $u_2$. Let the correlation coefficients between u and $u_1$ and $u_2$ be $\rho_1$ and $\rho_2$, respectively, and let the correlation coefficient between $u_1$ and $u_2$ be $\rho$. Further, let us assume that u, $u_1$ and $u_2$ have a joint Gaussian probability density. Then the conditional probability for u, when $u_1$ and $u_2$ are given, becomes $$P_2(u_1, u_2; u) = \frac{1}{\sqrt{2\pi}}\sqrt{\frac{1-\rho^2}{1+2\rho\rho_1\rho_2-\rho^2-\rho_1^2-\rho_2^2}}\frac{1}{\sigma_u} \times \quad (4.57)$$

$$\exp\left(-\frac{1-\rho^2}{1+2\rho\rho_1\rho_2-\rho^2-\rho_1^2-\rho_2^2}\frac{1}{2\sigma_u^2}\left\{u - \left[\frac{\rho_1-\rho\rho_2}{1-\rho^2}u_1 + \frac{\rho_2-\rho\rho_1}{1-\rho^2}u_2\right]\right\}^2\right).$$

We see that in this case the most probable value of u becomes $$u_0 = \frac{\rho_1-\rho\rho_2}{1-\rho^2}u_1 + \frac{\rho_2-\rho\rho_1}{1-\rho^2}u_2. \quad (4.58)$$

The probability $\psi_2$ that $|u-u_0|$ is less than $\in|u_0|$ is in this case given by $$\psi_2\left(\rho_1, \rho_2, \rho, \epsilon, \frac{u_0}{\sigma_u}\right) = erf\left(\sqrt{\frac{1-\rho^2}{2(1+2\rho\rho_1\rho_2-\rho^2-\rho_1^2-\rho_2^2)}}\,\epsilon\frac{|u_0|}{\sigma_u}\right). \quad (4.59)$$

In the limit when $\rho=1$ and $\rho_1=\rho_2\equiv\rho_0$ we obtain the same result as in the case when there is only one upstream measurement with $u_0=\rho_0(u_1+u_2)/2$.

It might be interesting to see if we get a better estimate with two upstream measurements if $\rho_1=\rho_2\equiv\rho_0$ and $\rho<1$. In this case (4.59) becomes $$\psi_2\left(\rho_0, \rho_0, \rho, \epsilon, \frac{u_0}{\sigma_u}\right) = erf\left(\sqrt{\frac{1+\rho}{2(1+\rho-2\rho_0^2)}} \epsilon \frac{|u_0|}{\sigma_u}\right). \quad (4.60)$$

Since $$\frac{1+\rho}{2(1+\rho-2\rho_0^2)} \geq \frac{1}{2(1-\rho_0^2)} \quad (4.61)$$

we find $\psi_2(\rho_0,\rho_0,\rho,\in, u_0/\sigma_u) \geq \psi_1(\rho_0,\in,u_0/\sigma_u)$.

If we also let $\rho$ be very close to unity it might be useful to evaluate the difference $\delta\psi = \delta\psi(\rho_0,\rho,\in,u_0/\sigma_u) = \psi_2(\rho_0,\rho_0,\rho,\in,u_0/\sigma_u) - \psi_1(\rho_0,\in, u_0/\sigma_u)$ to the first order in $1-\rho$.

The definition (4.55) of the Error Function implies $$\delta\psi = erf\left(\sqrt{\frac{1+\rho}{2(1+\rho-2\rho_0^2)}} \epsilon \frac{|u_0|}{\sigma_u}\right) - erf\left(\frac{\epsilon}{\sqrt{2(1-\rho_0^2)}} \frac{|u_0|}{\sigma_u}\right) \quad (4.62)$$

$$= erf\left(\left\{\sqrt{\frac{1+\rho}{2(1+\rho-2\rho_0^2)}} - \frac{1}{\sqrt{2(1-\rho_0^2)}}\right\} \epsilon \frac{|u_0|}{\sigma_u}\right)$$

$$\approx erf\left(\frac{(1-\rho)\rho_0^2}{4(1-\rho_0^2)} \frac{1}{\sqrt{2(1-\rho_0^2)}} \epsilon \frac{|u_0|}{\sigma_u}\right)$$

$$\approx \frac{1}{2\sqrt{2\pi}} \frac{(1-\rho)\rho_0^2}{(1-\rho_0^2)^{3/2}} \epsilon \frac{|u_0|}{\sigma_u}.$$

As an example, let $\rho_0=0.9$, $\in=0.2$ and $|u_0|/\sigma_u=2$. Then (4.54) and FIG. 23 shows that $\psi_1(\rho_0,\in,u_0/\sigma_u) \approx 0.64$. From (4.62) we get the increase $\delta\psi \approx 0.78(1-\rho)$ when two upstream velocities are used. We expect that the spatial configuration implies that $\rho \leq \rho_0$. This means that the probability increase is less than about 0.08, corresponding to a 12% "improvement".

Several different systems for localised measurement of wind velocity have been devised. Most practical applications are based on the Doppler effect with optical hetero- or homodyning.

A laser is not absolutely mandatory, but it is very difficult to get good measurements with an incoherent light source. Thus only lasers are considered for the light (radiation) source. The lasers considered for the present application are listed in Table 1.

Table 1. Potential and actual lasers for long-range laser anemometry. It is noted that the holmium laser is attractive for wind measurements; however, the price and complexity of current lasers prohibit the application in low-cost systems. Future developments may change this. For the reference beam configuration it is mandatory that the intrinsic laser noise (not the photon noise) is extremely low.

| Laser | Wavelength $\mu$m | Power output | Coherence properties and noise | Efficiency | Compact and robust | Eye-safe | Price |
|---|---|---|---|---|---|---|---|
| CO2 | 10.6 | High | Good | >10% | yes (waveguide) | yes low | medium– |
| Tm,Ho:YAG | 2.1 | High | medium | ~1% | (not currently) | yes | very high |
| Nd: YAG | 1.06 (0.53) | Medium–high | medium | ~1% | partly | no | medium |
| GaAs | 0.85 | low | medium–low | >10% | yes (very) | no | low |
| Argon | 0.488/0.514 | medium | good | ~0.01% | no | no | high |

At the current state of technology only the CO2 laser is a viable option for an efficient long-range system with a potential for being manufactured at a reasonable cost.

Solid-state lasers may become attractive in the future. An applicable solid-state laser should have a wavelength in a transmission window of the atmosphere and should preferably be eye-safe. Solid-state lasers that fulfil these requirements are based on YAG (yttrium-aluminum-garnet) as host material and are doped with a material defining the optical wavelength. This may be rare earth materials. The price of such lasers (Tm,Ho:YAG and equivalent) is currently very high (~USD 10,000 and up). Nd:YAG lasers pumped by semiconductor lasers could be a viable alternative because they are more likely to be available at a reasonable price. However, they are not eye-safe.

GaAs semiconductor lasers can be produced at very low prices. Advances within arrays of phase locked lasers may even make it possible to produce lasers with adequate output power generated with a very high wall-plug efficiency considerably larger than 10%). It is, however, not likely that low-cost eye-safe semiconductor lasers will be available in the near future.

The argon laser has been the "workhorse" of short-range laser doppler anemometers. However, it is not eye-safe and the wall plug efficiency is very low. The wavelengths that can be obtained are generally too short for the present application.

The optics serves to reshape the beam from the laser, to transmit it to the measuring region, to collect the scattered light and to direct it to the detector, possibly with a properly mode-matched reference beam. The optical components can be classified as either refractive/reflective or diffractive.

Refractive (and reflective): change of direction of propagation upon passage from one medium to another. Only simple optical operations are possible in each element; the mechanical construction supporting the optics is in general expensive; the volumes of the elements are as a rule large.

Diffractive (incl. holographic): surface or volume structure causes interference in the form of diffraction that may mimic conventional optical components—but it is also possible to implement components with no refractive equivalent; multiplexing is possible. These elements are expensive as single elements, but (potentially) of low cost in mass production.

The type of optics very much depends on the optical wavelength. Glasses that are transparent in the visible and near infrared cannot be used at longer wavelengths. ZnSe is now the preferred material for refractive optics at the long infrared wavelengths.

Optical components must usually be fabricated to tolerances much smaller than the optical wavelength. Intrinsically this makes it cheaper to produce infrared optics (often counterbalanced by the more expensive materials that are also difficult to process). Reflective metal optics is attractive for especially $CO_2$ laser applications. The reflective optics can be combined with diffractive structures made as relief patterns on the metal surfaces. Beamsplitters and isolators are delicate and expensive for the wavelength of the $CO_2$ laser.

Scanning a plane (or strictly speaking: part of a sphere) may be performed with sets of mirrors. This is sometimes done to get a spatial average or to obtain different velocity components of the mean wind. The principles are simple but the mechanical layout of existing implementations is bulky. Different ranges can in principle be covered by incorporating a zoom facility in the optics. If scanning is to be incorporated, the beam expanding optics may be designed to incorporate this facility. This would provide a much more compact and robust implementation, but could not be implemented in a compact form with off-the-shelf components. Ray-tracing calculations indicates that with diffraction limited performance and only two optical elements it may be very difficult to obtain more a scan larger than 10% of the mean range or angular position.

In order to obtain information about the movement of a given volume element in a fluid, it is necessary that the propagation of light is perturbed in the volume. Ideally the light should propagate unperturbed to the measuring volume. In the measuring volume light should be redirected to the receiver. The situation is rarely that ideal: the propagation of light is affected by refractive index variations. These may be generated by turbulence causing temperature fluctuations that again give rise to small fluctuations of the refractive index of the atmosphere. For shorter ranges (<100 m) in the open air this effect is normally negligible.

Scattering by turbulence induced refractive index fluctuations cannot generate the desired return signal. The spatial distribution of the refractive index fluctuations is identical to the distribution of the turbulence induced temperature fluctuations. The spatial scales are larger than the Kolmogorov or inner turbulence scales, which in the atmosphere are larger than a millimeter. The scattered light is essentially confined to an angular region given by the ratio of the optical wavelength to the size of the scattering structure (weak interaction assumed), ie.

$$\alpha_{sc} \approx \lambda_{opt} / \Lambda_{sc}, \tag{17}$$

which implies that light is only scattered within a narrow cone in the forward direction.

However, there are in general many small particles in the atmosphere. They occupy a large size range from below $10^{-2}$ $\mu$m to above 10 $\mu$m. The size distribution is often described by the so-called Junge particle size distribution. In a standard atmosphere the background aerosol concentration is about 400 particles/cm$^3$. The concentration close to the ground is usually much higher especially the concentration of large particles. The concentration and distribution to a large extent depend on the weather conditions and emissions from the ground.

Light scattered by small particles has been the subject of research for more than a hundred years. A well established theory exists for spherical dielectric particles. It is essentially so that for particles much smaller than the optical wavelength, backscattering and forwardscattering are about equal. As the particle size increases, forwardscattering increases much more than backscattering. (see, e.g., Bohren and Huffman.)

In the reference beam backscattering system the transmitted and the received light appears in the same spatial mode (except for the direction of propagation). This fact has the consequence that for a focused continuous wave system the collected light power is independent of range and transmitter/receiver aperture as can be seen below.

The collected light power is given by the following simple expression:

$$P_r = \langle \sigma \rangle c V \frac{P_t}{A_0} \frac{A_t}{z^2}, \tag{18}$$

where $\langle \sigma \rangle$ is the mean scattering cross-section, c the particle concentration, V the volume of the measuring volume, $P_t$ the transmitted laser power, $A_0$ the cross-section of the measuring volume, $A_t$ the receiver/transmitter area and z the distance to the centre of the measuring volume. The parameters for a Gaussian beam are as follows:

$$r_0 = \frac{z}{kr_t}; \quad k \equiv 2\pi/\lambda$$
$$\Delta z = r_0^2 k = \frac{\pi}{4} \lambda \left(\frac{z}{d_z}\right)^2 \tag{19}$$

from which $A_0$, $A_t$, and V are evaluated and substituted into eq. 18. This gives that the received power is given by $$P_r = \frac{\langle \sigma \rangle c}{k}; k = 2\pi/\lambda, \tag{20}$$

i.e. proportional to the following product mean scattering cross-section×particle concentration× wavelength.

Figure 11:
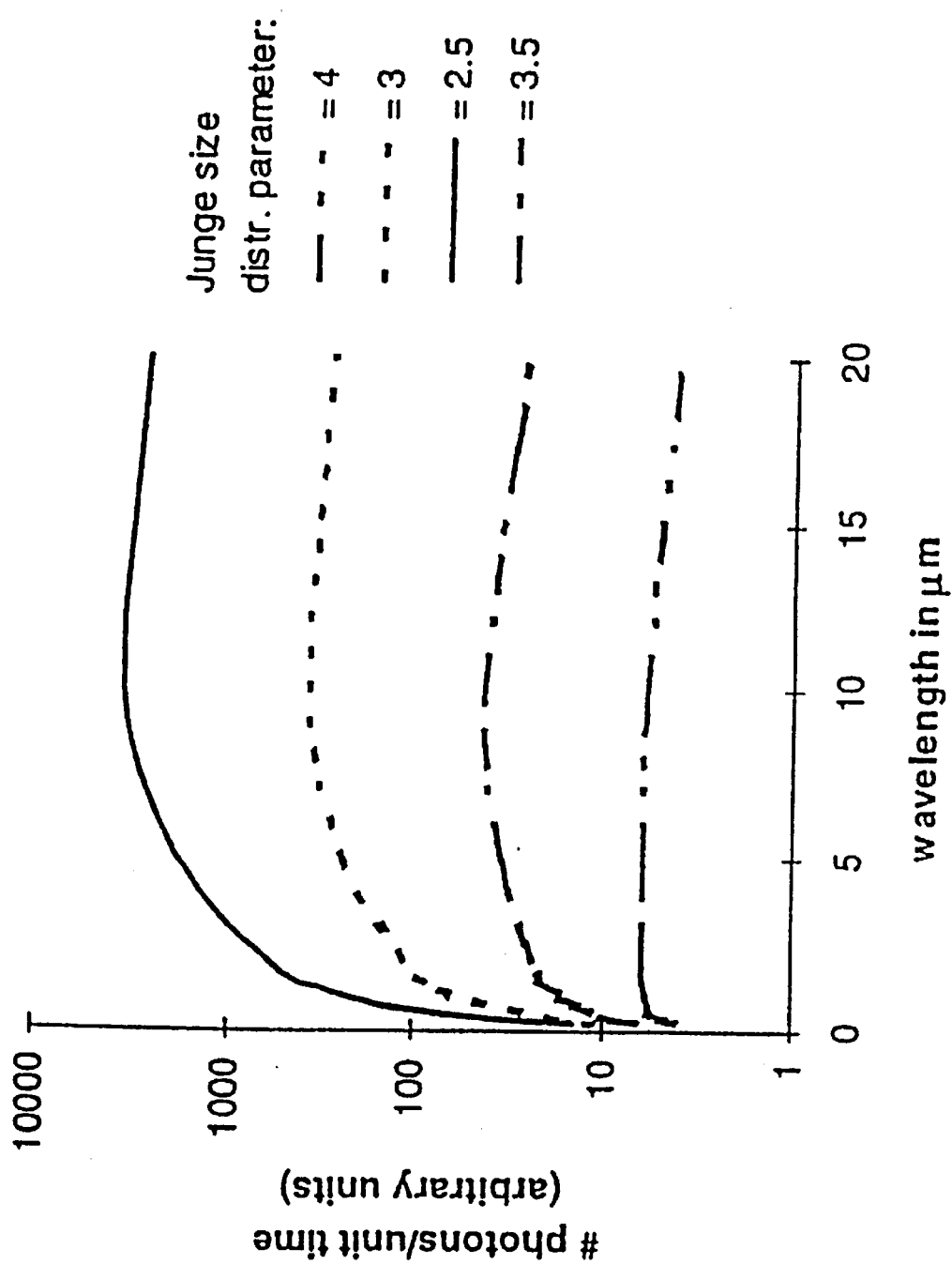
FIG. 11 shows the number of photons/sec scattered by particles in a single spatial mode versus the optical wavelength assuming that 1 watt of light power is transmitted in a counter propagating mode otherwise identical to the light collection mode. The parameter v is a characteristic parameter of the Junge particle size distribution. A large v implies a relatively large amount of small particles. Note that the number of photons per second peaks at around 10 µm almost independently of v. The wavelength dependence of the refractive index has not been incorporated.

The backscattering of light is calculated in a single spatial mode expressed in terms of photons/sec assuming the scattering volume is illuminated with a beam that propagates in the same spatial mode—except for the direction. This appears to be very relevant when the power requirements for a reference beam configuration is investigated. The results as a function of the optical wavelength are shown in FIG. 11. It is noted that the curve peaks at around 10 $\mu$m almost irrespective of the specific particle size distribution. The simple $CO_2$ system has its wavelength at 10.6 $\mu$m! A constant refractive index is assumed. This is probably a good approximation for a background aerosol that mainly consists of various metal oxides. For water particles the refractive index increases drastically with increasing wavelength, which enhances the backscattering cross-section relative to the values obtained for the visible part of the spectrum. The backscattering may be 2–3 times higher at a humidity close to 100% relative to 0% humidity.

Most particles in the atmosphere are not spherical. The exact shape has a small impact on the light scattering characteristics if the particles are smaller than the optical wavelength. The analysis of light scattering from large particles of arbitrary shapes is in general difficult—or impossible —to calculate. However, there is good experimental evidence that average values for light scattering can usually be estimated quite well assuming spherical particles.

Light must propagate through the atmosphere from the transmitter to the measuring volume; and the scattered light must propagate back to the receiver. Ideally light would propagate completly unaffected by the atmosphere—except for the light scattering in the measuring volume. The conditions are actually generally quite close to this situation (this is essential for the success of laser anemometry in general). However, at longer ranges and in adverse weather conditions three phenomena that may have an impact on the propagation by:

Extinction caused by absorption and especially by scattering. In clear weather the effect of this is marginal, but may be substantial in heavy fog or rain. There is a small absorption of light by $CO_2$ in the atmosphere at the wavelength of the $CO_2$ laser. For very long-range applications (kilometres) an isotope of $CO_2$ has been used for the laser to obtain a slightly de-tuned wavelength. For shorter ranges (such as in the present case) the absorption is negligible. The extinction caused by heavy fog may from 15–60 dB/km at 10.6 $\mu$m. At the ranges of interest in the present context this would only correspond to a variation in extinction by a factor of 2–3. This would partly be compensated by increased scattering under such weather conditions. The effects are considerably larger at shorter wavelengths.

Perturbation of the wavefronts by turbulence induced refractive index variations in the atmosphere will be negligible at a wavelength of 10.6 $\mu$m and at the ranges considered here, but is considerably larger at shorter wavelength. Data on the wavefront perturbations caused by strong rain and fog are not available but based on heuristic arguments it is anticipated that the effect is small (i.e. does not prevent useful measurements).

The photodetector serves to convert the optical signal to an electronic signal. Phototdetectors relevant to laser anemometry are all of a type where photons are absorbed whereby free charge carriers are produced. The carriers (electrons) may be released from the material in which the photons are absorbed generating a current in an external circuit, or they may generate electron-hole pairs in an pn-junction also causing a photocurrent in an external circuit (photovoltaic effect). The free carriers may change the conductivity of the responsive element, which is exploited in photoconductive detectors.

Before the characteristics of some detectors is considered, it is appropriate to consider the noise, i.e. random fluctuations of the signal that limit the performance of the system. The different types of noise that may play a role in the present context can be classified as follows;

Light is detected in quanta with a random distribution (intrinsically a Poisson distribution).

The detection process itself is a random process: not all photons impinging on the detector will generate free carriers and it is random which photons actually do generate charge carriers.

Even without illumination free carriers will often appear and they generate noise.

The random generation and recombination is a random process.

Thermal noise caused by the random motion of free charge carriers in the responsive element and/or in the subsequent electronics.

Lattice G–R noise; the random generation and recombination of free charge carriers may cause noise especially in photoconductors used at infrared wavelengths.

1/f-noise. The physical mechanism of this type of noise notably found in solid-state detectors is not well understood.

Photodetectors for the detection of modulated light can be classified into the following categories:

photomultiplier tubes;

p-n photodiodes;

photoresistors;

'drag' detectors;

thermal detectors;

phyroelectric detectors.

Various types of preferred detectors are compared in Table 2.

TABLE 2

Comparing different types of photodetectors.

|  | p-n diode | avalanche diode | photoresistor | PMT |
| --- | --- | --- | --- | --- |
| Quantum eff. | High | high–medium | high | low–medium |
| Dark current | Medium | medium | medium–high | low |
| Amplification | 1 | medium | medium | very high |
| Speed | Fast | fast | fast | fast |
| Spectral region | Very broad (different materials) | Broad | very broad (different materials) | narrow (visible + adjacent) |

For the continuous signal the processor should not be gated but should be of a sliding window type (e.g. a frequency- or phase locked loop, or a spectral analyser that operates in real time). For the present application it is desirable that the processing incorporates a velocity estimation based on both the current measurement and the history the past evolution of the velocity (i.e. the likelihood of a large difference between two consecutive measurements is much smaller than the likelihood of a small difference— assuming the temporal resolution is smaller than the scale of the velocity fluctuations). A so-called Maximum A Posteriori (MAP) procedure is an integral part of tracking processors. A Kalman type of filtering of the temporal sequence obtained with a spectrum analyzer processor is also feasible. An outline of a laser anemometer for control of wind turbines is given in this section.

Figure 12:
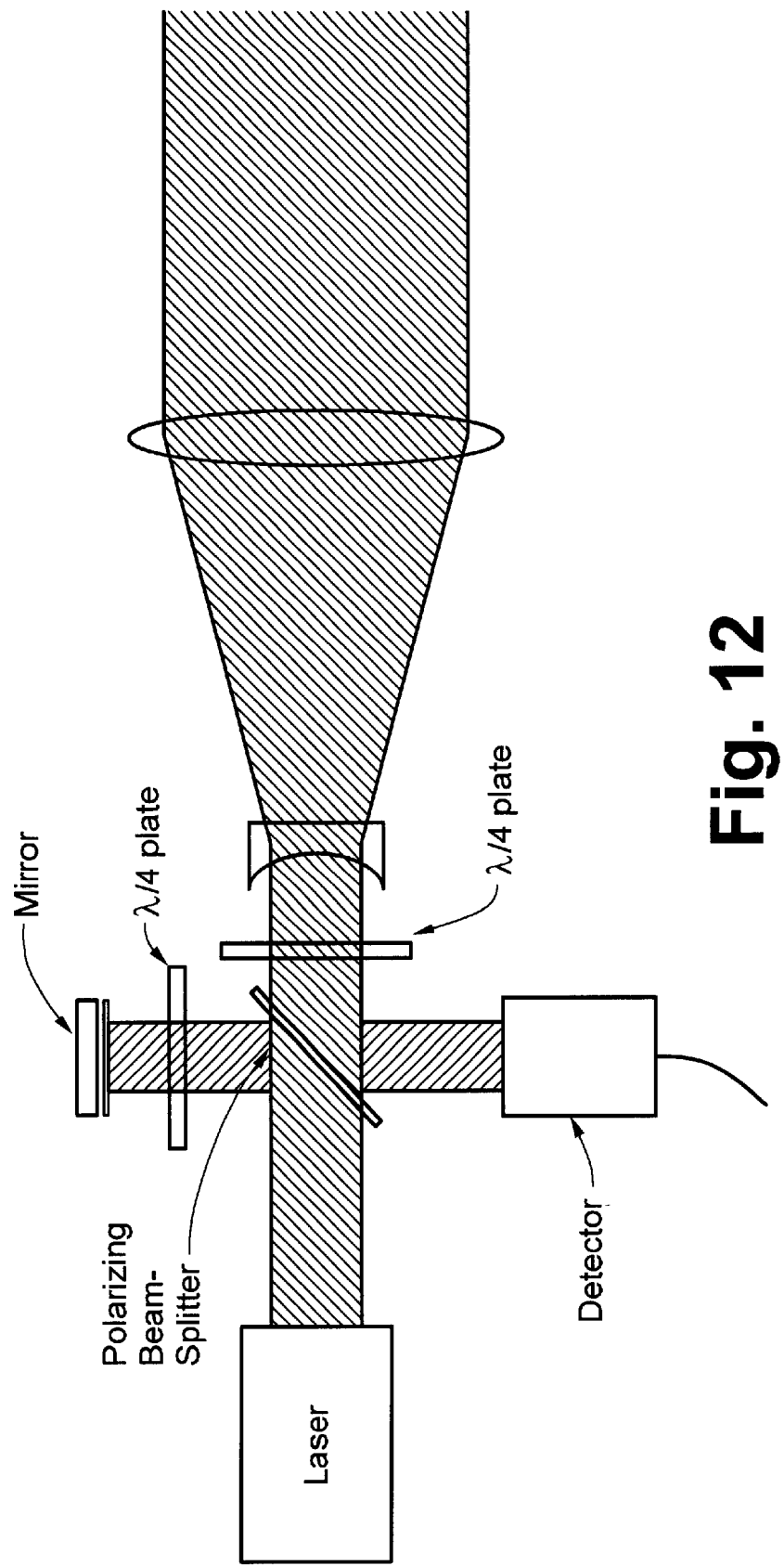
FIG. 12 shows a layout of the optics of a back-scattering reference beam configuration. The polarising beam-splitter in conjunction with the wave plates ensures efficient utilisation of the available laser power.

On the basis of the discussion in the previous section it has been decided to consider a backscattering reference beam system based on a cw CO2 laser. The system shown in FIG. 12. However, the price of a system based on off-the-shelf components would be rather. Thus dedicated low-cost components would be needed for a system for actual wind turbine control.

Considerable cost reductions are possible by introducing the following elements:

a custom designed waveguide laser;

combined reflective and diffractive metal optics, which could be manufactured on a precision turning machine. Polarisation elements, necessary for a reasonably efficient use of the laser power, could be incorporated by deep surface relief structures.

Figure 13:
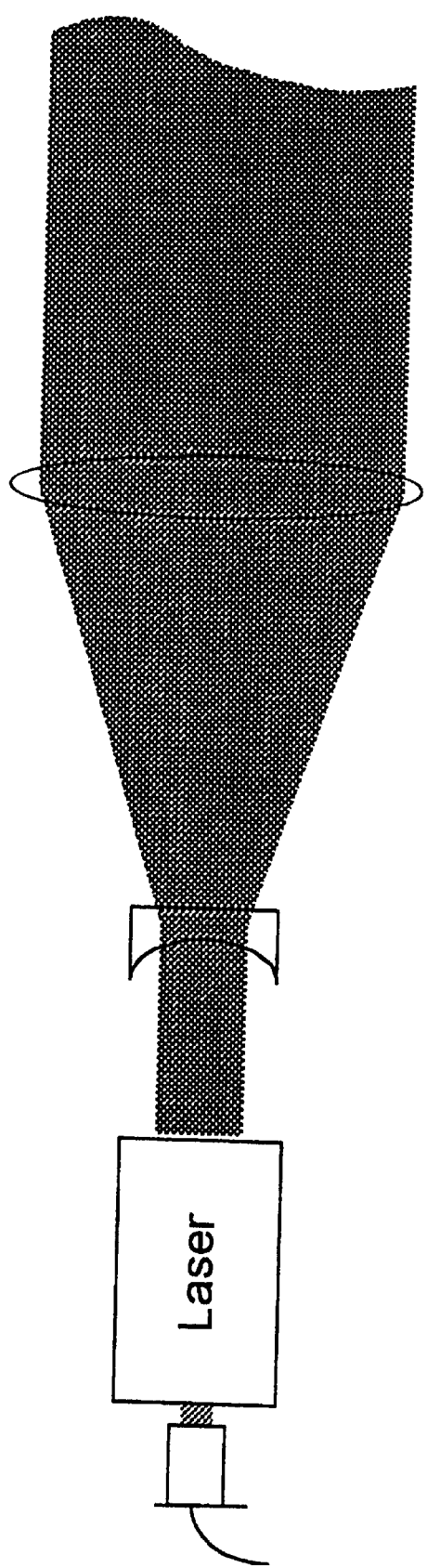
FIG. 13 shows a layout of an autodyne or self-mixing configuration. The scattered light propagating in the same mode as the transmitted light—except for the direction of propagation—enters the laser and perturbs the internal power level. This is detected by the photodetector at the rear end of the laser. It is noted that a it is very important to avoid reflections that would enter the laser in a mode that could be amplified in the laser.
Figure 14:
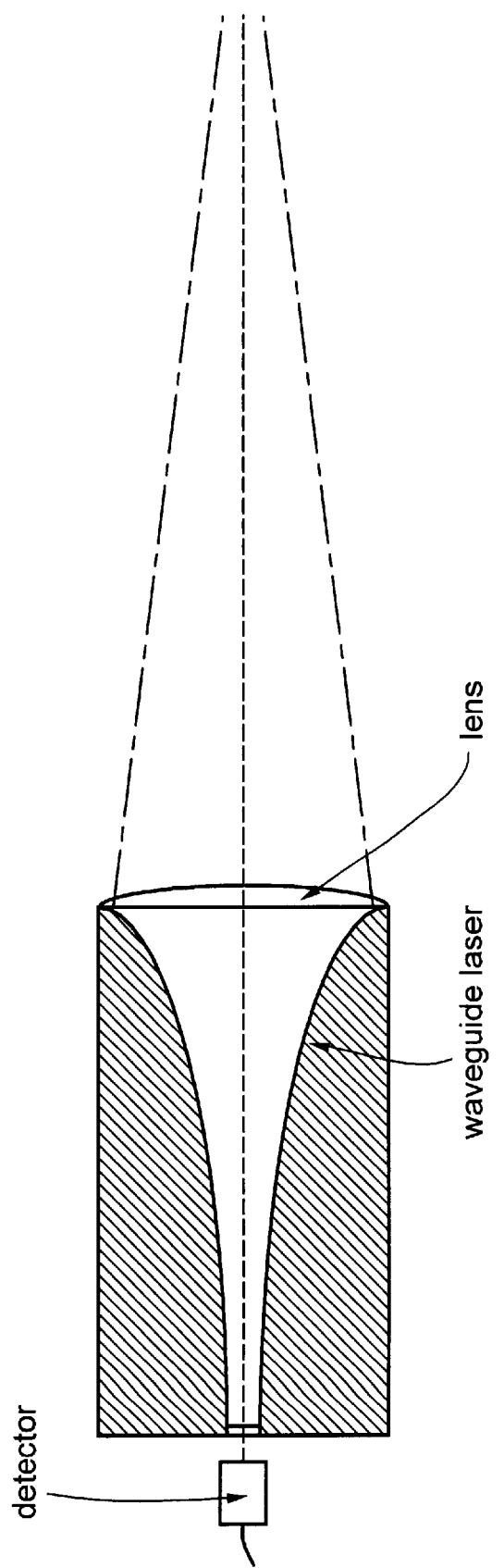
FIG. 14 shows an autodyne system with a tapered waveguide laser.

A very simple system—which has received surprisingly little attention in the literature—could be based on a so-called autodyne configuration: the collected light power is fed directly into the laser itself and will therefore perturb the power output. The perturbation is monitored at, e.g., the rear end of the laser (FIG. 13). It is even conceivable to implement the laser as a tapered waveguide with an output window that serves both as laser mirror and focusing element. The tapering is done to reduce size and enhance laser gain. A high internal gain is important for the autodyne configuration seen in FIG. 14.

Figure 15:
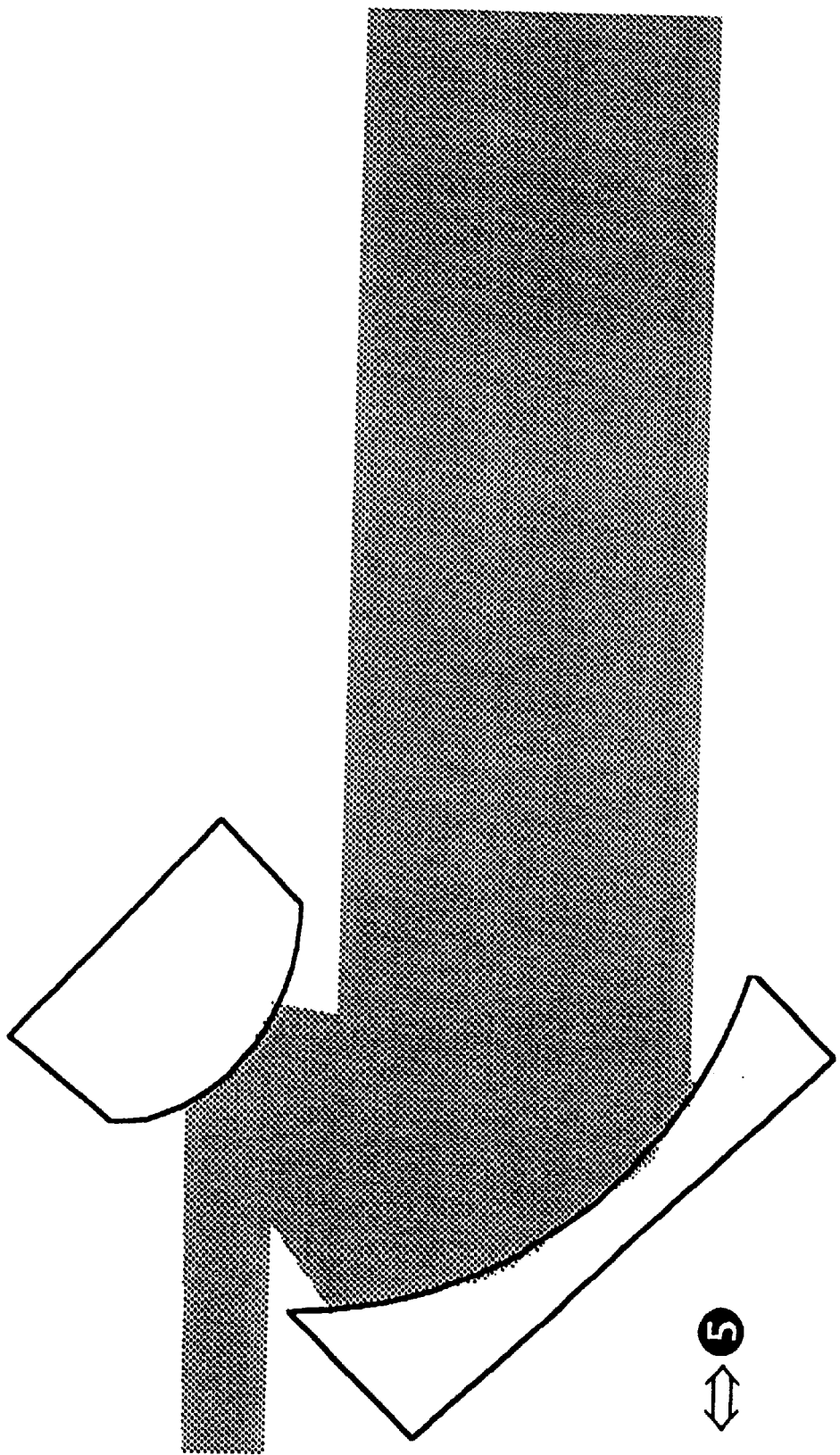
FIG. 15 shows a beam expander based on reflective optics. The location of the measuring volume in a plane perpendicular to the initial optical axis can be changed by tilting the largest of the two mirrors. The distance to the measuring volume can be changed by a displacement of the large mirror. It is important that it is the large mirror that is moved.

The optics may be implemented in a form that allows for adjustment of the location of the measuring volume—possibly a conical scan or measurements at different ranges. Reflective optics would be preferable. The beam expander could be implemented as indicated in FIG. 15. Ray-tracing calculations indicate that diffraction limited operation with only two elements may be very difficult if scanning capabilities must be incorporated. A combined reflective and diffractive system appears to have a better performance.

A window will be necessary to protect the optics. This could be made of either germanium or zinc selenide.

Figure 16:
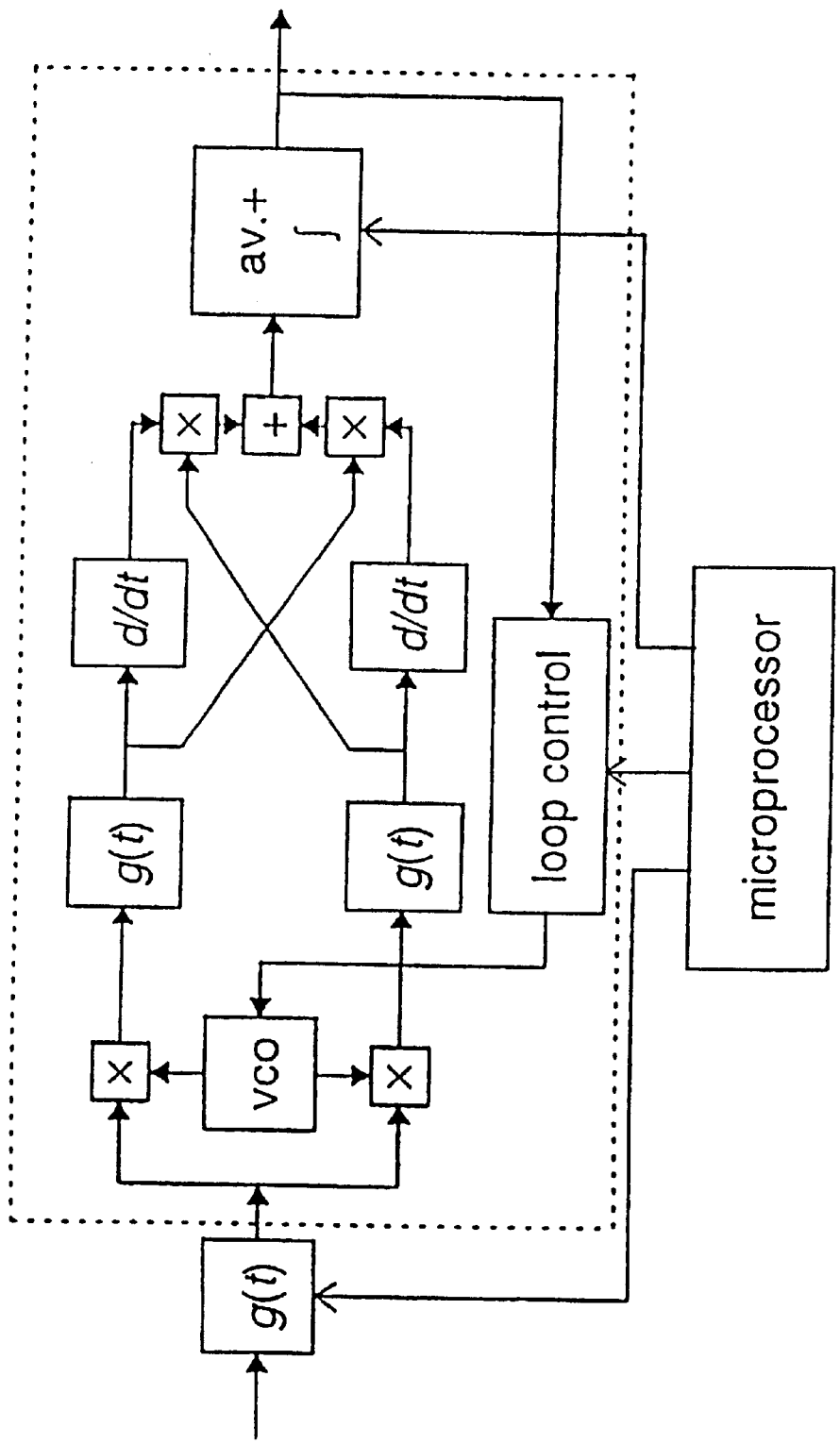
FIG. 16 shows a signal processing layout. The frequency locked loop (inside the dashed line) may be implemented in the form of an application specific integrated circuit. The microprocessor sets the range as well as the loop speed and will also control the initiation of the lock. The input filter is envisaged to be based on traditional analogue circuitry. It serves to eliminate the dc signal from the detector and to confine the noise bandwidth.

A likely signal processing scheme could be based on a frequency locked loop (described in section 5.1). A block diagram is illustrated in FIG. 16.

The primary specifications are mean measuring distance and spatial averaging length. On the basis of the discussion in section 3 and assuming a rotor diameter of 60 m, the following values are selected:

Mean measuring distance, L 150.0 m

Spatial averaging, $2\Delta z$: 22.5 m

This gives the following values:

Focal diameter, d0: 17.4 mm

Figure 17:
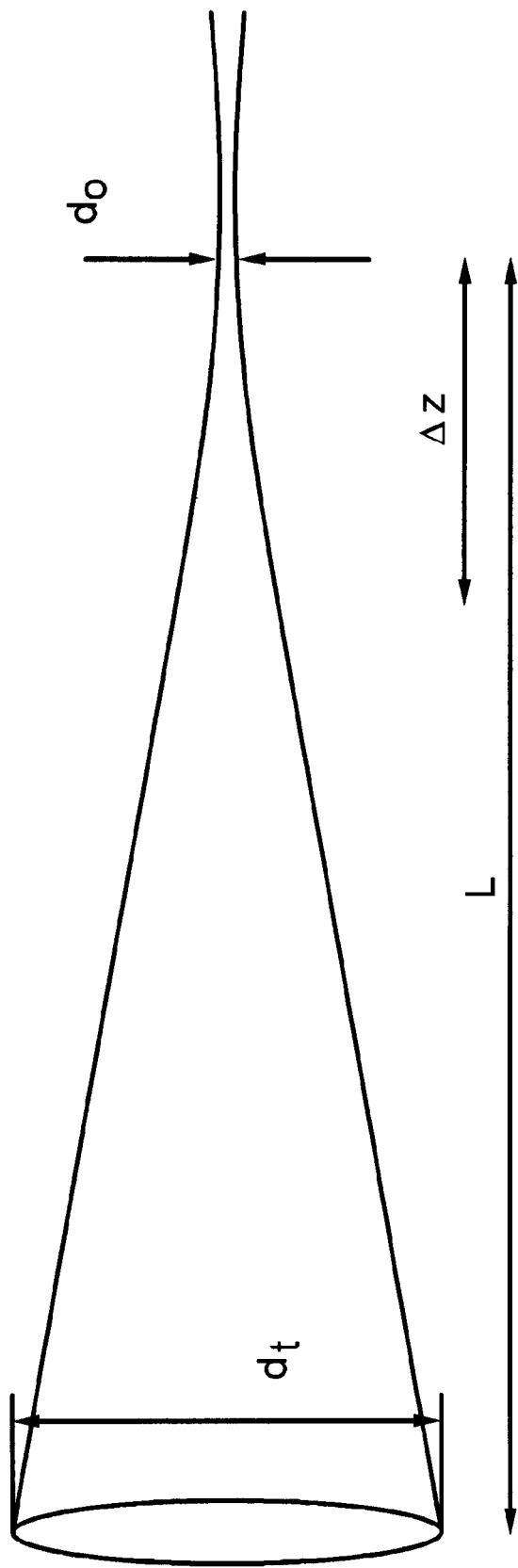
FIG. 17 shows the beam parameters: $d_t$ is the diameter of the transmitter/receiver aperture, $d_o$ is the focal beam diameter, L is the distance to from the anemometer to the centre of the measuring volume and $2\Delta z$ is the length of the measuring volume.

Transmitter diameter, $d_t$: 116 mm as illustrated in FIG. 17.

The calibration of the system is given by (frequency/velocity):

$$\frac{f}{v} \equiv \frac{C}{2\pi} = 0.189 \frac{\text{MHz}}{\text{m/s}}. \tag{21}$$

Figure 18:
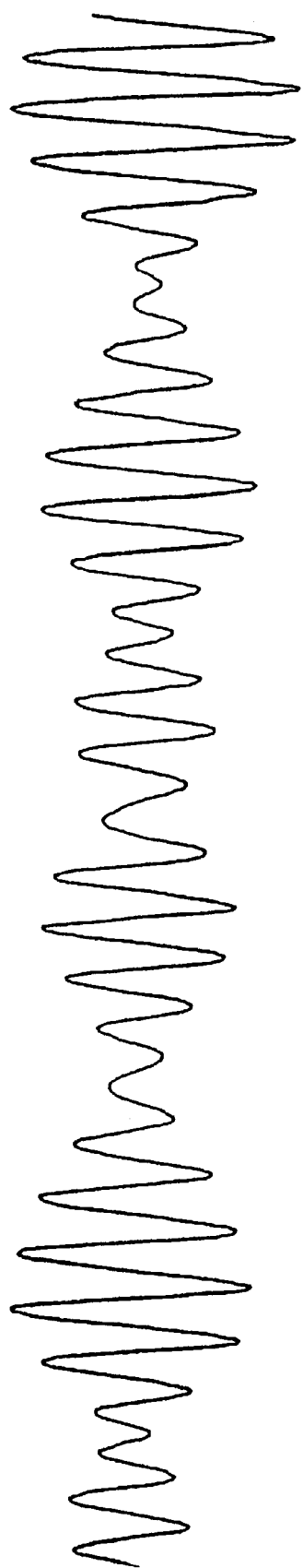
FIG. 18 shows a simulated detector signal assuming 10% turbulence, The third line concerns the development of advanced control strategies and systems that will improve efficiency, reduce static as well as dynamic structural loads, reduce noise, and facilitate the grid connection in terms of power quality. Also the application of power electronics, allowing for variable-speed operation, will probably be common in the future.

A simulated detector signal is shown in FIG. 18.

There are a number of causes of the uncertainty of the measurement:

Intrinsic signal fluctuations associated with the random distribution of particles and/or turbulence.

Intrinsic signal fluctuations associated with turbulence on spatial scales smaller than the size of the measuring volume or on spatial scales smaller than the averaging time.

Photon noise

Thermal noise

Intrinsic fluctuations of the laser (laser noise)

Perturbation of the beam propagation caused by random fluctuations of the refractive index of the atmosphere.

The statistical uncertainty caused by the intrinsic signal fluctuations has been investigated by a number of researchers (originally by George and Lumley). For the present application, the relative variance is given by $$\frac{\text{var}\{\hat{v}_z\}}{v_{z0}^2} = \frac{\text{var}\{\hat{\omega}_d\}}{\omega_d^2} = \kappa^2 \frac{1}{\Delta \omega T_{av}}, \tag{22}$$

where $\kappa$ is the relative spectral broadening. In the present case this broadening is given by the relative turbulence level on scales smaller than the length of the measuring volume.

The minimum relevant averaging time is the transit time through the measuring volume, i.e.

$$T_{av,min} = 2\Delta z/v_{z0}. \tag{23}$$

Substituting eq. (23) into eq. (22) and utilising the fact that the relative spectral broadening is equal to the relative turbulence level yields $$\frac{\text{var}\{\hat{v}_z\}}{v_{z0}^2} = \frac{\kappa}{2\Delta z C}. \tag{24}$$

For the specific example, the relative uncertainty is 0.16%. This must be considered to be the achievable minimum uncertainty.

The condition for photon noise limited operation is established first. This implies that the photon noise dominates over the thermal noise. The thermal noise is given by $$\langle v_{tn}^2 \rangle = 4k_B TRB, \tag{25}$$

where kB is Boltzmann's constant, T the absolute temperature, R the resistance and B the bandwidth. The photon noise would generate a noise signal given by the following expression $$\langle v_{pn}^2 \rangle = \zeta^2 hvPB \tag{26}$$

where $\zeta$ is the detector sensitivity (volts/watt), hv the photon energy, P the light power and B the bandwidth. (The expression is obtained by converting simple Poisson photon statistics to equivalent power fluctuations.) Dominating photon noise implies that $$P > \frac{R}{\zeta^2} \frac{4k_B T}{hv}. \tag{27}$$

For realistic values of resistance ($\approx$100 ohm) and sensitivity (>10 volts/watt) the inequality is fulfilled for power in the milliwatt range, which is no serious requirement to the laser and still low enough to stay within the maximum power level of newer non-cooled photoconductors. With the inequality fulfilled the signal-to-noise ratio is exclusively given by the collected light power and no detection scheme can provide a better signal-to-noise ratio (the only free parameter is the quantum efficiency, which for good detectors can only vary with a factor of 2).

The following quantities are assumed to be given:

Five watt of laser power from a waveguide laser (a waveguide laser gives a more compact and robust implementation).

A negligible laser noise level. (In reference beam detection it is often the laser noise that limits the performance. However, it appears that single-frequency $CO_2$ lasers used in coherent lidar systems have such a low noise level in the spectral region of interest that the noise of the laser is negligible. This is consistent with experimental observations at Rise in connection with plasma diagnostics experiments using reference beam detection.

The collected light power is $10^{-10}$ W.

An overall quantum efficiency of 40%.

A detector with a detectivity D* of 1000 $cmHz^{1/2}W^{-1}$ and an area A of 1 $mm^2$.

A detection bandwidth B of 5 MHz.

The signal-to-noise ratio is then found to be larger than 20 dB, which implies that the photon noise will have a negligible impact on the statistical uncertainty of the measurement.

A system for on-line control could either be mounted on the top of the generator/gearbox casing or it could be mounted in the hub of the rotor. In the first case it is most likely necessary to incorporate a shutter facility that block the laser beam while a blade intersects the path of the beam. This facility serves to eliminate the very strong illumination of the detector by light reflected off the blades of the turbine. A simple rotating shutter synchronised with the main rotor could do this.

Mounting the laser anemometer in the hub would eliminate the blade intersection problem. However, power and signal connections would be more complicated. Some new large wind turbines do have a hollow main shaft in which electric wires can be placed or the laser beam could be transmitted through the hollow axle. A conical scan may be achievable by tilting the optical axis slightly with respect to the axis of the main shaft. Information about wind shear may be obtained in this way; thus making it possible to control the pitch angle in relation to the angular position of a given rotor blade.

The applicability of laser anemometers in conjunction with wind turbines is investigated. The main conclusions of the initial investigations are: Relevant measurements for both power calibration and control can be performed.

A reference beam $CO_2$ laser system is preferable to the common LDA based on visible or near infrared light.

A dedicated laser system is needed for a compact robust instrument. An autodyne system is very attractive in terms of robustness and (potential) low cost; however, the performance in relation to systems with external reference beam detection needs to be investigated.

The effect of sever weather (rain, snow, strong optical turbulence etc.) need further investigation.

In relation to the relevance of such systems it is noted that the industry estimates a 12% annual growth rate for wind turbines that would benefit from a good feed forward control system and the number of wind turbines will be about 3000 units/yr. five years from now.

What is claimed is:

1. A wind turbine, comprising:
   a nacelle; and
   a wind velocity measurement system which determines air velocities at a relative position in front of the wind turbine, said wind velocity measurement system including a laser anemometry system for emission of a laser light beam for illumination of particles in the air, wherein the laser anemometry system is mounted on the nacelle to follow the motion of the nacelle so that the determination of the air velocity in front of the wind turbine is accomplished at a same relative position with respect to the nacelle.

2. A wind turbine according to claim 1, wherein the laser anemometry system includes
   a laser for emission of the laser light beam for illumination of particles in the air;
   a detector for detection of light emitted from particles that have been illuminated by the laser light beam, and
   a signal processor connected to the detector for generating a velocity signal corresponding to the velocity of the particles based on the detected light.

3. A wind turbine according to claim 2, wherein the laser anemometry system is a Michelson interferometer type laser Doppler anemometer.

4. A wind turbine according to claim 2, wherein the light emitted from particles in the air is transmitted to the laser for perturbation of the power output of the laser, wherein the detector detects the light emitted from the particles that have interacted with the illuminating laser light by measuring the perturbed power output of the laser.

5. A wind turbine according to claim 4, wherein the laser comprises a tapered waveguide with an output window constituting a laser mirror and a focusing element.

6. A wind turbine according to claim 2, wherein the signal processor includes a frequency locked loop.

7. A wind turbine according to claim 1, comprising:
   adjustable pitch blades,
   a pitch controller for setting a desired blade pitch, the desired blade pitch being set according to a signal provided at an input of the pitch controller, and
   a control system for controlling the output power generated by the wind turbine by control of blade pitch, said control system including
   a control output connected to the input of the pitch controller,
   a velocity input connected to an output of the velocity measurement system, and
   a pitch processor for calculation of the desired blade pitch based on determined air velocity values and generation of a corresponding pitch control signal provided at the control output,
   wherein the determination of air velocities in front of the wind turbine compensates for a delay in setting the desired blade pitch so that an actual blade pitch setting is set in accordance with an actual wind velocity at the adjustable pitch blades during operation of the wind turbine.

8. A wind turbine according to claim 7, wherein the pitch processor is adapted to generate a pitch signal so that a tip speed ratio is substantially equal to a desired ratio.

9. A wind turbine according to claim 7, wherein the pitch processor is adapted to generate a pitch control signal so that a tip speed can not exceed a maximum velocity value.

10. A wind turbine according to claim 8, wherein the pitch processor is adapted to generate a pitch control signal so that a tip speed can not exceed a maximum velocity value.

11. A wind turbine according to claim 7, wherein the pitch processor further comprises a data storage for storage of a first function of a shaft torque as a function of a blade pitch and wind speed for the wind turbine, and wherein the pitch processor is adapted to calculate the desired pitch utilizing the first function.

12. A wind turbine according to claim 7, wherein the pitch processor further comprises a data storage for storage of a second function of a normalized power output $C_p$ as a function of a blade pitch and a tip speed ratio for the wind turbine, wherein the pitch processor is adapted to calculate the desired blade pitch utilizing the second function.

13. A wind turbine according to claim 12, wherein the pitch processor is further adapted to determine a pitch that, for a given tip speed ratio, substantially maximizes the normalized power output $C_p$.

14. A wind turbine according to claim 1, comprising:
   a control system for controlling an output power generated by the wind turbine by control of a load connected to a power output of the wind turbine, said control system including
   a control output connected to the load,
   a velocity input connected to an output of the wind velocity measurement system, and a processor for calculation of a desired load value based on the determined air velocity values at the position in front of the wind turbine and for generation of a corresponding load signal provided at the control output, wherein use of the determined air velocity values by the processor compensates for a delay in setting the desired load value so that an actual load value setting is set in accordance with an actual wind velocity at a plurality of blades of the wind turbine during operation of the wind turbine.

15. A system for determination of a power curve of the wind turbine according to claim 1, comprising a power measurement system for determination of an output power generated by the wind turbine.

16. A method of determining a characteristic power curve for a wind turbine, comprising:

mounting, on a nacelle of the wind turbine, a wind velocity measurement system including a laser anemometry system for determination of air velocities in a position in front of the wind turbine;

connecting a power measurement system for determination of an output power generated by the wind turbine, said power measurement system being connected between a power generator of the wind turbine and a load receiving the output power generated by the wind turbine; and recording values of wind velocity determined by the wind velocity measurement system and corresponding output power values determined by the power measurement system.

17. A method of controlling output power from a wind turbine, comprising:

mounting, on a nacelle of the wind turbine, a wind velocity measurement system which includes a laser anemometry system;

determining air velocities in a position in front of the wind turbine; and providing determined velocity values to a power control system of the wind turbine.

18. A wind turbine according to claim 1, wherein the wind velocity measurement system further comprises spatial scanning means for performing a measurement scan in front of the wind turbine by changing a relative position of a point where the measurement is performed so that information related to a vertical and/or horizontal wind velocity distribution in front of the wind turbine may be obtained.

19. The wind turbine of claim 1, wherein the relative position at which air velocities are determined is located in front of the wind turbine at a distance of 2.5 times a wind turbine rotor diameter.

20. The wind turbine according to claim 1, wherein the wind velocity measurement system includes a shutter mechanism to block reflection of the laser light beam from a wind turbine rotor.

21. The method of claim 16, further comprising determining a turbulence of an airflow in the position in front of the wind turbine.

22. The method of claim 16, wherein the position in front of the wind turbine is located at a distance of 2.5 times a wind turbine rotor diameter.

23. The method of claim 17, wherein the position in front of the wind turbine is located at a distance of 2.5 times a wind turbine rotor diameter.

24. A wind turbine, comprising:

a nacelle; and a wind velocity measurement system which determines air velocities at a relative position in front of the wind turbine, said wind velocity measurement system including a laser for emission of a laser light beam for illumination of particles in the air, wherein the laser is mounted in a hub of the wind turbine to follow the motion of the nacelle so that the determination of the air velocity in front of the wind turbine is accomplished at a same relative position with respect to the nacelle.

25. A wind turbine, comprising:

a nacelle; and a wind velocity measurement system which determines air velocities at a relative position in front of the wind turbine, said wind velocity measurement system including a laser for emission of a laser light beam for illumination of particles in the air, wherein the laser is mounted in a hollow shaft of a hub of the wind turbine to follow the motion of the nacelle so that the determination of the air velocity in front of the wind turbine is accomplished at a same relative position with respect to the nacelle.

* * * * *